United States Patent [19]
Miyazaki et al.

[11] Patent Number: 5,412,597
[45] Date of Patent: May 2, 1995

[54] SLOPE DETECTION METHOD, AND INFORMATION DETECTION/WRITING APPARATUS USING THE METHOD

[75] Inventors: Toshihiko Miyazaki, Hiratsuka; Hiroshi Matsuda, Isehara; Hisaaki Kawade, Yokohama; Ken Eguchi, Yokohama; Haruki Kawada, Yokohama; Hideyuki Kawagishi, Ayase; Yoshihiro Yanagisawa, Isehara; Keisuke Yamamoto, Yamato; Toshimitsu Kawase, Atsugi; Takahiro Oguchi, Atsugi; Toshihiko Takeda, Atsugi; Masahiro Tagawa, Atsugi, all of Japan

[73] Assignee: Canon Kabushiki Kaisha, Tokyo, Japan

[21] Appl. No.: 155,375

[22] Filed: Oct. 15, 1993

Related U.S. Application Data

[63] Continuation of Ser. No. 975,115, Nov. 12, 1992, abandoned, which is a continuation of Ser. No. 794,463, Nov. 19, 1991, abandoned.

[30] Foreign Application Priority Data

Nov. 20, 1990 [JP] Japan .................................. 2-317030
Jul. 17, 1991 [JP] Japan .................................. 3-201151

[51] Int. Cl.$^6$ ............................................. G11C 13/00
[52] U.S. Cl. ...................................... 365/174; 365/151
[58] Field of Search ................... 365/174, 114, 151; 39/126

[56] References Cited

U.S. PATENT DOCUMENTS

| | | |
|---|---|---|
| 3,903,735 | 9/1975 | Wilson . |
| 4,575,822 | 3/1986 | Quate ................................. 365/174 |
| 4,829,507 | 5/1989 | Kazan et al. ........................ 369/126 |
| 5,073,874 | 12/1991 | Yamada et al. ..................... 365/226 |
| 5,229,606 | 7/1993 | Elings et al. .................... 365/189.01 |

FOREIGN PATENT DOCUMENTS

| | | |
|---|---|---|
| 0240150 | 10/1987 | European Pat. Off. . |
| 0338083 | 10/1989 | European Pat. Off. . |
| 0351260 | 1/1990 | European Pat. Off. . |
| 0368579 | 5/1990 | European Pat. Off. . |
| 0421437 | 4/1991 | European Pat. Off. . |
| 61-80536 | 4/1986 | Japan . |
| 63-161552 | 7/1988 | Japan . |
| 63-161553 | 7/1988 | Japan . |
| 63-204531 | 8/1988 | Japan . |
| 2-147803 | 6/1990 | Japan . |
| 2204130 | 11/1988 | United Kingdom . |

OTHER PUBLICATIONS

"A Three-Dimensional Surface Profile Measuring System With A Specimen-Levelling Device" by T. Kanada, et al., Measurement Science And Technology, vol. 2, No. 3, Mar. 1, 1991, pp. 191–197.

"Scanning Tunneling Microscopy", Binnig, et al., Helvetica Physica Acta., vol. 55, (1982) pp. 726–735.

*Primary Examiner*—Terrell W. Fears
*Attorney, Agent, or Firm*—Fitzpatrick, Cella, Harper & Scinto

[57] ABSTRACT

A method for detecting a slope of a surface of an information record medium in an apparatus for detecting/writing information using one or a plurality of probes from/in the information record medium. The surface of the information record medium is scanned using the probe. The information from the surface of the information record medium is detected through the probe when the scanning is executed, and the slope of the surface of the information record medium is detected on the basis of the detected information.

23 Claims, 16 Drawing Sheets

SLOPE DETECTION METHOD, AND INFORMATION DETECTION/WRITING APPARATUS USING THE METHOD

This application is a continuation of application Ser. No. 07/975,115, filed Nov. 12, 1992, now abandoned, which is a continuation of application Ser. No. 07/794,463 filed Nov. 19, 1991, now abandoned.

BACKGROUND OF THE INVENTION

1. Field of the Invention

The present invention relates to a slope detection method, and an information detection/writing apparatus using the method.

The present invention is particularly suitable for an information processing apparatus, an information processing method, and a slope correction method, which utilize a scan type probe microscope (to be abbreviated to as an SXM hereinafter) having a mechanism for correcting a slope between a scan plane of a probe and a record medium surface.

2. Related Background Art

In recent years, along with expansion of the information-oriented society, large-capacity memories have been developed. Recently, a recording/reproduction apparatus, which uses a scan type tunnel microscope (to be abbreviated to as an STM hereinafter), has appeared (e.g., Japanese Patent Application Laid-Open No. 61-80536, U.S. Pat. No. 4,575,822, and the like). An STM developed by G. Binnig et. al. [G. Binnig et. al., Helvetica Physica Acta, 55, 726 (1982)] is a method of observing a surface condition of a sample by utilizing the fact that a tunnel current flows when a voltage is applied between a metal probe (probe electrode) and a conductive sample, and they are caused to approach each other to a distance of about 1 nm. This current is very sensitive to a change in distance between the probe and the sample. Thus, the distance between the probe and the sample is measured by scanning the sample while maintaining a constant tunnel current, or a change in tunnel current, obtained when the sample is scanned while maintaining a given distance, is measured, thereby detecting the surface condition of the sample. At this time, a resolution in an in-plane direction is about 0.1 nm. Therefore, upon application of the STM technique, high-density recording/reproduction on the atomic order (on the order of subnanometers) can be attained (e.g., Japanese Patent Application Laid-Open Nos. 63-204531, 63-161552, 63-161553, and the like). On the other hand, along with development of the STM technique, various techniques (i.e., SXM) for measuring a surface condition of a sample by scanning a probe on a sample surface while detecting various other interactions (not limited to a tunnel current) depending on a distance between a probe and a sample, have been proposed. When the SXM is utilized, high-density recording/reproduction can be attained in the same manner as a case utilizing the STM.

As described above, high-density recording/reproduction can be attained in principle by utilizing the SXM technique. However, in practice, various problems remain unsolved. The problems in the SXM will be described below using the STM as an example.

First, a probe must be scanned to be parallel to a record medium surface. When this condition is not satisfied, i.e., when a record medium is sloped and placed on a sample table, an observed surface pattern may be distorted, the probe may collide against the record medium surface, or an uncontrollable state may occur since the probe is too far from the record medium surface. When a scan range (a region used for recording information) is relatively small, and a moving amount of the probe in a vertical direction (to be referred to as a Z axis direction hereinafter) caused by the slope of a record medium falls within a Z-axis direction fine-movement control range of the probe (e.g., 1 $\mu$m or less), only the moving amount of the probe caused by the actual structure of the record medium surface can be removed from the moving amount of the probe using an electrical filter. In fact, an STM apparatus is equipped with filters for removing various frequency components. Japanese Patent Application Laid-Open No. 2-147803 proposes an STM apparatus, which comprises a mechanism capable of rotating a sample so as to solve the above problem. However, according to these methods, when a recording region is sufficiently large or when a record medium is large, the moving amount in the Z axis direction of the probe forced by the slope of the record medium may often exceed a control range of the probe. Even if the moving amount in the Z axis direction of the probe does not exceed the control range amount, unless a plane where, e.g., the tip of the probe is moved during probe scan, i.e., a direction of a scan plane (to be referred to as an X-Y plane hereinafter) of the probe, is parallel to a direction in a record medium plane (to be referred to as an X'-Y' plane hereinafter), the moving distance of the probe in the X-Y plane direction becomes different from the real space distance on the X'-Y' plane. Therefore, a noncoincidence (non-parallelism) between the X-Y plane and the X'-Y' plane may often impair recording/reproduction precision.

Second, in a recording/reproduction method utilizing the STM, it is indispensable to control the distance between a probe and a record medium with a precision on the order of submicrons. In this case, a piezoelectric element is normally used in distance control. However, the operation speed of the piezoelectric element has an upper limit of about 1 MHz. Therefore, when the STM technique is used in recording/reproduction of, e.g., image information requiring a high transfer speed, a plurality of probes must be inevitably used. For example, Japanese Patent Application Laid-Open No. 62-281138 proposes a technique for improving a recording/reproduction speed using a plurality of probes (multi-probes). In this case, for the same reason as that described in the above paragraph, it is expected that the scan planes of all the probes are adjusted to be parallel to the record medium surface. However, a specific method of attaining such adjustment has not been proposed yet.

SUMMARY OF THE INVENTION

It is the first object of the present invention to provide a slope detection method, and an information detection/writing apparatus using the method, which can readily detect a slope of a record medium surface with respect to a probe in an apparatus for detecting/writing information from/in an information record medium through a probe.

It is the second object of the present invention to provide an information processing apparatus, which has a mechanism for controlling to set scan planes (X-Y planes) of probes to be parallel to a sample surface (X'-Y' plane) as much as possible, so as to improve information processing precision especially in an information processing apparatus having a plurality of probes among information processing apparatuses utilizing the SXM.

Other objects of the present invention will become apparent from the following detailed description of the embodiments of the present invention.

DESCRIPTION OF THE PREFERRED EMBODIMENTS

The preferred embodiments of the present invention will be described in detail hereinafter with reference to the accompanying drawings.

First Embodiment

Figure 1A:
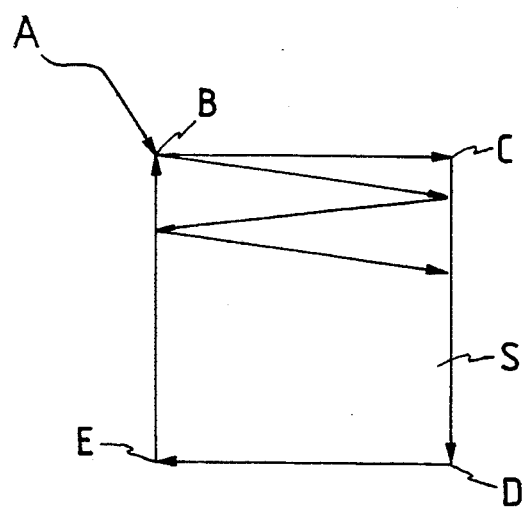
FIG. 1A is a view showing the relationship between a probe and a record medium according to the first embodiment of the present invention.
Figure 1B:
FIG. 1B is an explanatory view of a moving method of the probe according to the first embodiment of the present invention.

FIGS. 1A and 1B are explanatory views when a method according to the present invention is applied to a recording/reproduction apparatus as an application of an STM, and show a state wherein a probe electrode 1 is scanned on a record medium 2. Note that A to E indicate points on the record medium 2, and information is recorded in a recording region S surrounded by the points B, C, D, and E.

The probe electrode 1 and the record medium 2 are caused to approach each other up to a tunnel region (an interval within a range wherein a tunnel current can flow between the probe electrode and the record medium) at an arbitrary point A on the record medium 2. The probe electrode 1 is moved to the point B on one corner of the recording region S while controlling the vertical distance of the probe electrode 1, so that a tunnel current value between the probe electrode and the record medium can become constant. Then, the probe electrode 1 is moved from the point B to the points C, D, and E in turn along the outer periphery of the recording region S, while similarly controlling the vertical position of the probe electrode 1 so as to maintain the constant tunnel region.

Figure 2:
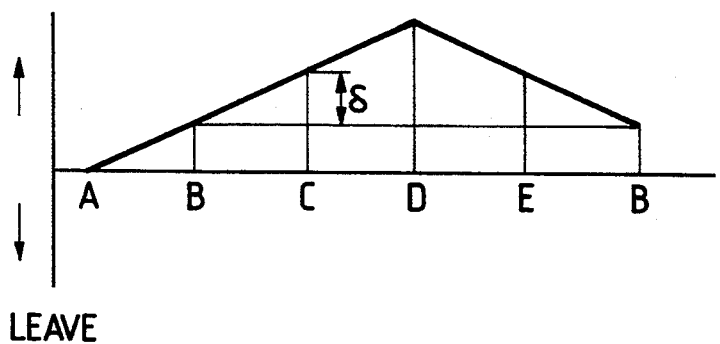
FIG. 2 is a view showing the relationship between a position on the record medium, and a control amount in a vertical direction of the probe electrode according to the first embodiment of the present invention.
Figure 3:
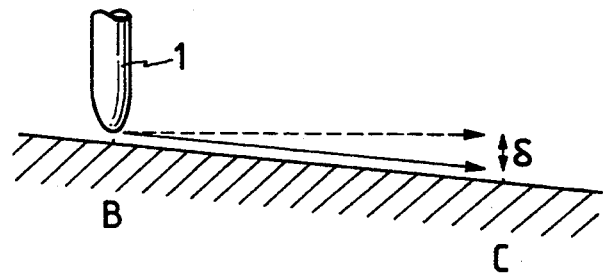
FIG. 3 is an explanatory view of the positional relationship between the probe and the record medium according to the first embodiment of the present invention.

FIG. 2 shows a vertical control amount (i.e., position) of the probe electrode 1 when the probe electrode 1 is moved along the outer periphery of the recording region S. In FIG. 2, the vertical control amount of the probe electrode 1 with reference to the point A in FIG. 1A is plotted along the ordinate. From the point A to the point D, control for moving the probe electrode 1 in a direction to approach the record medium 2 is made. From the point D to the point B, control for causing the probe electrode 1 to leave from the record medium 2 is made. In this case, in the positional relationship between the probe electrode 1 and the record medium 2 when the probe electrode 1 is scanned from, e.g., the point B to the point C, the point C is sloped downward by a distance δ from the point B, as shown in FIG. 3. In other words, as can be seen from FIG. 3, in the above-mentioned case, the record medium 2 is sloped with respect to the scan plane of the probe electrode 1, such that the point A is closest to the scan plane, the point B is the second closest to the scan plane, the points C and E are the third closest to the scan plane, and the point D is farthest from the scan plane. After the slope is detected in this manner, slope correction is performed, and thereafter, the recording region is scanned from the point B in a zig-zag manner, as shown in FIG. 1A, thus recording/reproducing information.

Figure 4:
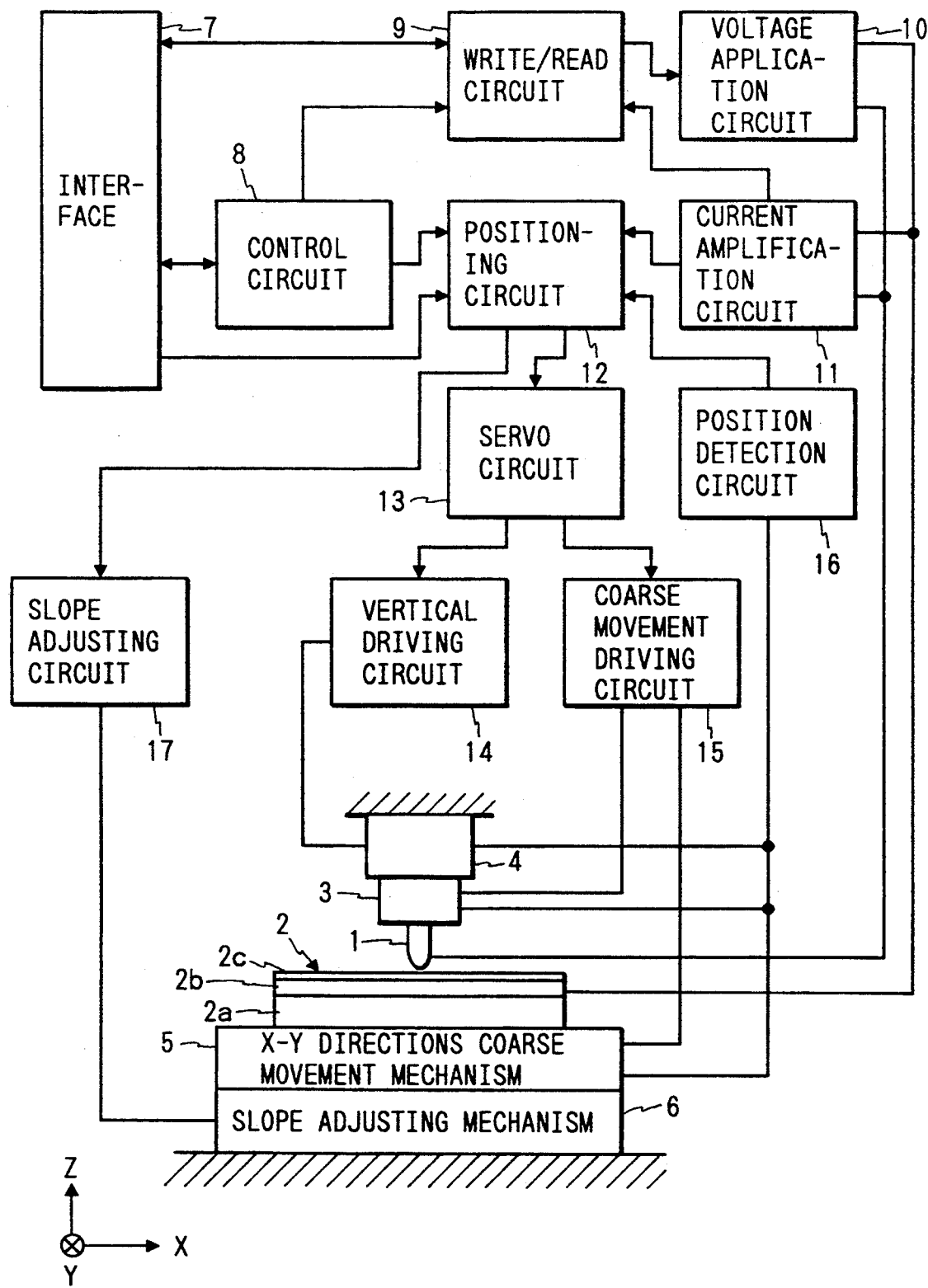
FIG. 4 is a block diagram of a recording/reproduction apparatus according to the first embodiment of the present invention.

FIG. 4 is a block diagram of a recording/reproduction apparatus to which the method of the present invention is applied. A tungsten probe electrode 1 prepared by an electrolyte polishing method is scanned by a scan device (X-Y directions fine movement mechanism) 3, and its vertical position is adjusted by a vertical direction movement mechanism 4. In a recording region S of a record medium 2, an undercoating electrode 2b formed by epitaxially-growing an Au layer on a flat substrate 2a obtained by cleaving mica, and a recording layer 2c formed by stacking four squaryllium-bis-6-octylazulene (to be referred to as SOAZ hereinafter) layers having an electrical memory effect by the Langmuir-Blodgett method are formed. The apparatus includes an X-Y directions coarse movement mechanism 5 for coarsely moving the record medium 2 with respect to the probe electrode 1 in the scan direction, and a slope adjusting mechanism 6 for performing a plane aligning operation of the record medium 2 with respect to the probe electrode 1. Furthermore, the apparatus includes an interface 7 for connecting the recording/reproduction apparatus to a host apparatus. Moreover, the apparatus includes a control circuit 8 for concentrically controlling operations among the respective blocks in the recording/reproduction apparatus, a write/read circuit 9 for writing/reading data according to an instruction from the control circuit 8, a voltage application circuit 10 for applying a pulse voltage between the probe electrode 1 and the record medium 2 on the basis of a signal from the write/read circuit 9 so as to write data, and for applying a read voltage in a read mode, a current amplification circuit (I/V converter) 11 for amplifying a current flowing between the probe electrode 1 and the record medium 2, and supplying the amplified current to the write/read circuit 9 as a read information signal in the read mode, a positioning circuit 12 for determining the positions of the probe electrode 1 and the record medium 2, and the slope of the slope adjusting mechanism 6 on the basis of signals from the current amplification circuit 11 and a position detection circuit (to be described later) according to an instruction from, e.g., the control circuit 8, a servo circuit 13 for servo-controlling the positions of the probe electrode 1 and the record medium 2 on the basis of a servo signal from the positioning circuit 12, a vertical driving circuit 14 for driving the vertical direction movement mechanism 4 of the probe electrode 1 according to a signal from the servo circuit 13, a coarse movement driving circuit 15 for driving the X-Y directions coarse movement mechanism 5 for the probe electrode 1 and the record medium 2 according to the signal from the servo circuit 13, a position detection circuit 16 for detecting the relative position between the probe electrode 1 and the record medium 2 in respective directions, and a slope adjusting circuit 17 for driving the slope adjusting mechanism 6 according to a plane aligning signal from the positioning circuit 12.

The operation will be described below. The vertical direction movement mechanism 4 is moved while applying an adjusting voltage of, e.g., 1 V between the probe electrode 1 and the undercoating electrode 2b of the record medium 2 using the voltage application circuit 10, thereby causing the probe electrode 1 to approach the record medium 2. Thus, a tunnel current flowing between the probe electrode 1 and the record medium 2 is measured by the current amplification circuit 11. When the tunnel current reaches, e.g., 1 nA, the vertical direction movement mechanism 4 is stopped. The X-Y directions coarse movement mechanism 5 is moved while operating the servo circuit 13, so that the tunnel current is kept at 1 nA. Thus, the probe electrode 1 reaches one corner of the recording region S. Thereafter, the probe electrode 1 is moved by the X-Y directions fine movement mechanism 3 along the outer periphery of the recording region S, while operating the servo circuit 13, so that the tunnel current is kept at 1 nA. At this time, slope information is detected by the positioning circuit 12 on the basis of the control amount of the vertical direction movement mechanism 4 of the probe electrode 1. The slope adjusting mechanism 6 is adjusted based on the slope information. Thus, the scan plane of the probe electrode 1 and the surface of the record medium 2 are aligned, so that the tunnel current can always become 1 nA when the probe electrode 1 is scanned while the vertical direction movement mechanism 4 is kept inoperative. These control operations are performed by the control circuit 8, the positioning circuit 12, and the like. In this manner, since the slope of the record medium 2 is corrected and adjusted by the slope adjusting mechanism 6, the probe electrode 1 can be scanned on the recording layer 2c on the surface of the record medium 2 without driving the vertical direction movement mechanism 4 within the scan range of the X-Y directions fine movement mechanism 3. Thus, a write/read scan speed can be increased. Note that the probe electrode 1 can be caused to approach the record medium 2 within the recording region S in the first approach operation.

Second to Fourth Embodiments

Figure 5A:
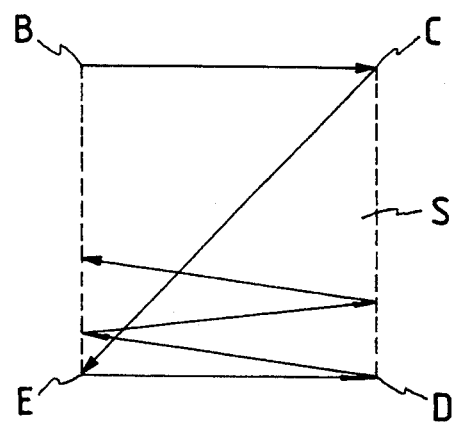
FIGS. 5A, 5B, and 5C are explanatory views of moving methods of a probe according to the second, third, and fourth embodiments of the present invention, respectively.
Figure 5B:
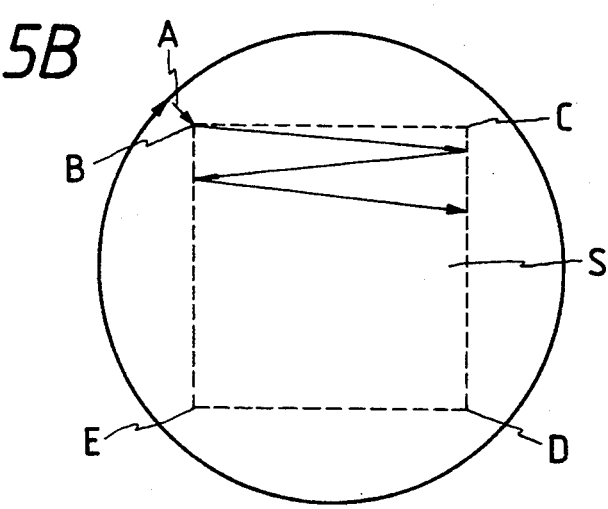
Figure 5C:
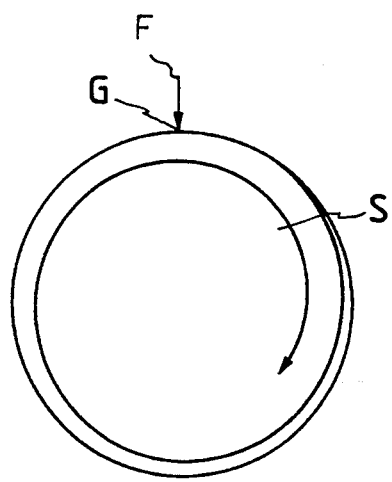

FIGS. 5A to 5C show other embodiments, and are respectively explanatory views of moving methods of a probe electrode 1 on a record medium 2. In the embodiment shown in FIG. 5A, the probe electrode 1 and the record medium 2 are caused to approach each other up to a tunnel region at a point B on the record medium 2, and the probe electrode 1 is then moved from the point B of a recording region S to points C, E, and D in turn, while controlling the vertical distance of the probe electrode 1 so as to keep a constant tunnel current. The surface of the record medium 2 is then aligned with the scan plane of the probe electrode 1 on the basis of the vertical control amount of the probe electrode 1, and thereafter, a scan operation in the recording region S is performed. During this scan operation, recording or reproduction is performed. In this embodiment, a scan length for adjustment can be shortened, and hence, a plane aligning time can be shortened.

In the embodiment shown in FIG. 5B, a probe electrode 1 and a record medium 2 are caused to approach each other up to a tunnel region at an arbitrary point A on the record medium 2, and the probe electrode 1 is moved to draw a circle larger than a recording region S, while controlling the vertical distance of the probe electrode 1 so as to keep a constant tunnel current. The surface of the record medium 2 is then aligned with the scan plane of the probe electrode 1 on the basis of the vertical control amount of the probe electrode 1 in this case, and thereafter, the probe electrode 1 is moved from the point A to a point B while controlling the vertical distance of the probe electrode 1 so as to keep a constant tunnel current. Thereafter, a scan operation in the recording region S is performed, and during the scan operation, recording or reproduction can be performed.

Furthermore, in the embodiment shown in FIG. 5C, a probe electrode 1 and a record medium 2 are caused to approach each other up to a tunnel region at an arbitrary point F on the record medium 2, and the probe electrode 1 is moved to a point G on the outer periphery of the recording region S, while controlling the vertical distance of the probe electrode 1 so as to keep a constant tunnel current. The probe electrode 1 is then moved from the point G on a circle along the outer periphery of the recording region S, while controlling the vertical distance of the probe electrode 1 so as to keep a constant tunnel current. The surface of the record medium 2 is aligned with the scan plane of the probe electrode 1 on the basis of the vertical control amount of the probe electrode 1 when the probe electrode 1 is moved along the outer periphery of the recording region S. Thereafter, a scan operation in the recording region S is performed.

In each of the above embodiments, the vertical control amount can be decreased upon scan of the probe electrode 1. Each of the above embodiments is applied especially to the recording/reproduction apparatus which utilizes the STM. The present invention can be similarly applied to a plane aligning operation between a probe of the STM and a sample surface.

In each of the above embodiments, in a method of detecting a slope of a carrier to be subjected to read-/write access of information by a probe, the slope of the carrier surface is detected on the basis of a signal obtained by scanning the probe.

According to the above-mentioned slope detection method, for example, a probe of an STM or a probe electrode of a recording/reproduction apparatus utilizing the STM is scanned over, e.g., the outer periphery of a scan region, and slope detection can be executed on the basis of a change in tunnel current at that time. As a result, a plane aligning operation between, e.g., a probe scan plane and a sample surface can be completed, and the probe can be scanned at a high speed within the scan region.

When the above method is applied to a recording/reproduction apparatus utilizing the STM, a delicate plane aligning operation between the scan plane of the probe electrode and the surface of a record medium can be attained, and recording information can be written or read while scanning the probe electrode in only the planar direction. As a result, the recording/reproduction speed can be increased.

Embodiments of types different from the above embodiments will be described below.

In order to achieve an information processing apparatus and an information processing method according to an embodiment to be described below, an information processing apparatus utilizing an SXM comprises an X-Y axes slope mechanism for sloping a sample table surface. As an example of the X-Y axes slope mechanism, it is preferable to utilize an X-Y axes slope stage or an X-Y axes goniostage. In this case, when a probe is scanned on a sample, since the scan operation is a relative operation, either of (1) a method wherein the probe itself can be scanned, (2) a method wherein the sample table can be scanned, or (3) a method wherein both the probe and the sample table can be independently scanned, may be employed. When the method (3) is employed, the scan direction of the probe itself is set to be parallel to the scan direction (X-Y direction) of the sample table. Furthermore, the information processing apparatus also comprises a mechanism for scanning the probe on a record medium surface, and detecting a slope amount between a scan plane (X-Y plane) and the record medium surface (X'-Y' plane) on the basis of movement of the probe in a direction (Z direction) perpendicular to the scan plane, means for controlling a driving operation of the X-Y axes slope mechanism to minimize the slope amount, i.e., an amplitude detection circuit for detecting an amplitude of a signal component having an arbitrary spatial frequency of signal components corresponding to a surface condition or recorded information obtained by scanning the probe, and a feedback circuit for controlling a driving mechanism for sloping an X-Y axes plane so as to make the amplitude zero or to decrease the amplitude as much as possible. Moreover, the information processing apparatus comprises a plurality of probes, and a distance adjusting mechanism, which can independently adjust the distances between the plurality of probes, and the record medium surface.

According to a plane aligning method of an embodiment to be described below, a plane aligning operation between a record medium surface (X'-Y' plane) and a plurality of probe electrode planes (X"-Y" planes), and a plane aligning operation of the record medium surface (X'-Y' plane) with the scanning plane (X-Y plane) are performed by first and second plane aligning means. Therefore, high-speed access of the plurality of probe electrodes and the record medium surface (X'-Y' plane) can be realized. More specifically, a specific one of the plurality of probe electrodes is used as a sensor for the first and second plane aligning means so as to perform the plane aligning operation between the record medium surface (X'-Y' plane) and the plurality of probe electrode planes (X"-Y" planes), and the plane aligning operation of the record medium surface (X'-Y' plane) with the scanning plane (X-Y plane). As a result, the plurality of probe electrode planes (X"-Y" planes) can be adjusted to be parallel to the scan plane (X-Y plane). In this manner, high-speed access of the plurality of probe electrodes and the record medium surface can be performed without moving or by slightly moving the probe electrodes in a direction perpendicular to the record medium surface in information processing.

Embodiments using the STM of the SXM will be described hereinafter.

Fifth Embodiment

A mechanism for detecting a slope amount between a scan plane (X-Y plane) and a sample surface (X'-Y' plane) in an information processing apparatus of the present invention will be described below. In this embodiment, an information processing apparatus utilizing an STM will be exemplified.

Figure 6:
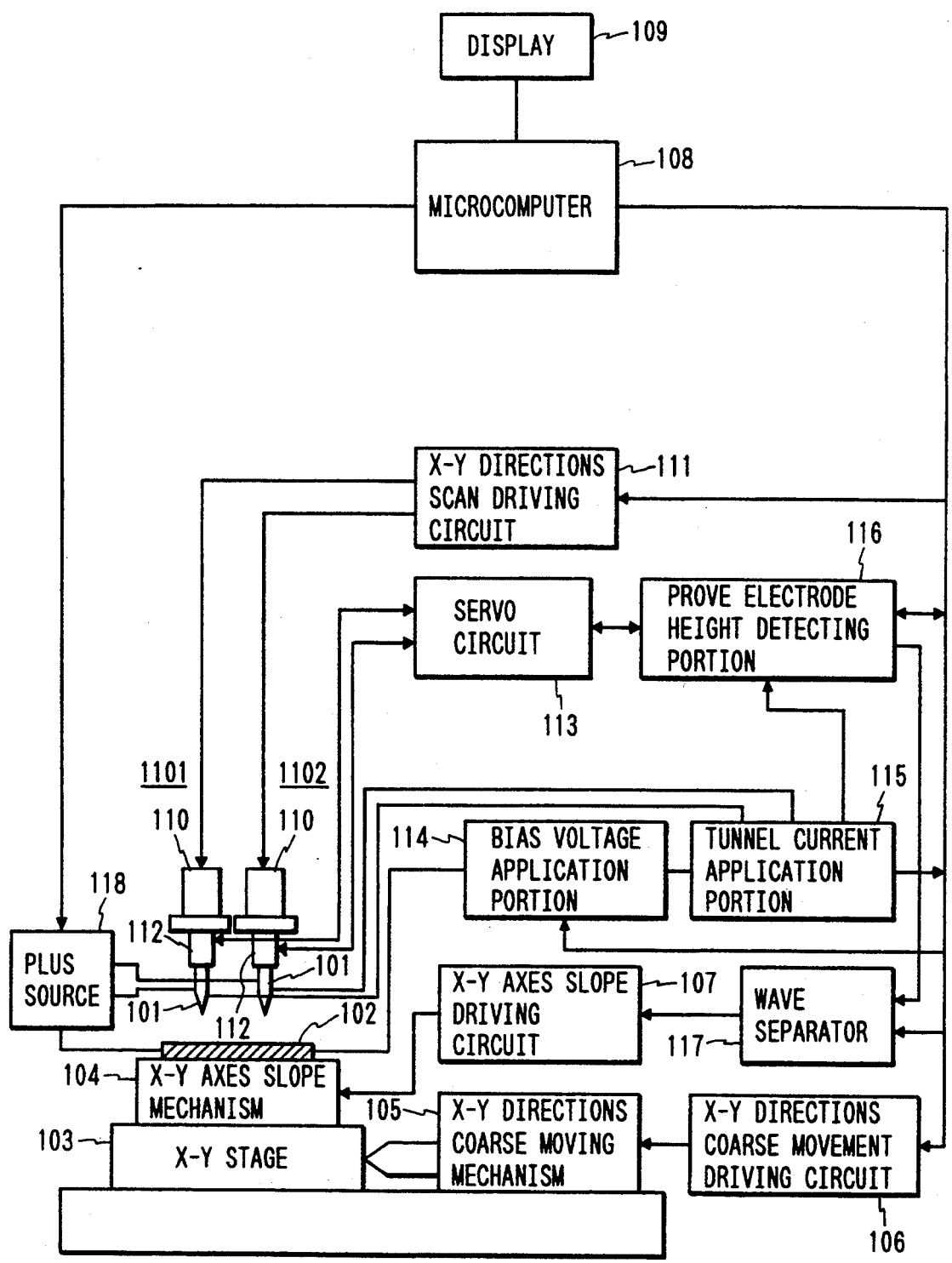
FIG. 6 is a block diagram showing an arrangement of an information processing apparatus according to the fifth embodiment of the present invention.

FIG. 6 is a block diagram showing an information processing apparatus utilizing an STM. In FIG. 6, the number of probes is minimum, i.e., two, for the sake of simplicity. More specifically, probe units 1101 and 1102 are arranged. However, the number of probe units may be increased, as a matter of course. In each probe unit, a probe electrode 101 can be formed of any material exhibiting conductivity, e.g., Au, W, Pt, a Pt-Ir alloy, a Pt-Rh alloy, Pd-coated Au, Pd-coated W, Ag, WC, TiC, or the like. The tip of the probe electrode 101 is preferably as sharp as possible. In this embodiment, the tip of a W rod having a diameter of 1 mm is sharpened by the electrolytic polishing method, and thereafter, a 1,000-Å thick Pd layer is coated (deposited). However, the method of preparing the probe electrode 101 is not limited to this. A record medium 102 is set on a sample table consisting of an X-Y stage 103 and an X-Y axes slope mechanism 104 arranged on the X-Y stage 103. The X-Y stage 103 can be driven by a microcomputer 108 through an X-Y directions coarse moving mechanism 105 and an X-Y directions coarse movement driving circuit 106. The X-Y axes slope mechanism 104 can also be controlled using an X-Y axes slope driving circuit 107. Note that a display 109 is connected to the microcomputer 108.

Figure 7:
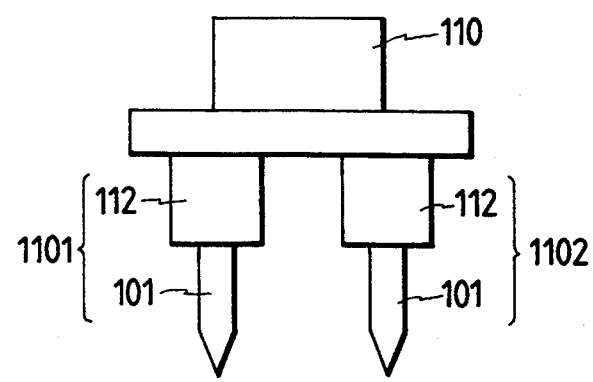
FIG. 7 is a view showing another embodiment of a probe unit.

In each of the probe units 1101 and 1102, an X-Y directions fine moving mechanism 110 is used for scanning the probe electrode 101 in X-Y directions, and comprises a stacked piezoelectric element in the present invention. However, the present invention is not limited to the stacked piezoelectric element, and any other actuators may be employed as long as they can attain fine movement on the order of Å. The X-Y directions fine moving mechanism 110 is controlled by an X-Y directions scan driving circuit 111. The X-Y directions as scan directions of the probe electrode 101, and the X-Y directions of the X-Y stage 103 are adjusted in advance to coincide with each other (to be parallel to each other). Therefore, the X-Y directions of the probe units 1101 and 1102 also coincide with each other. In FIG. 6, the probe electrodes 101 can be independently controlled in scan operations in the X-Y directions. Alternatively, as shown in FIG. 7, the probe electrodes 101 may be interlocked with each other to move in the X-Y directions. In this case, the scan directions of the probe electrode 101, and the X-Y directions of the X-Y stage 103 are also adjusted in advance to coincide with each other (to be parallel to each other). In each of the probe units 1101 and 1102, a Z direction fine moving mechanism 112 is used for finely moving the probe electrode 101 in the Z axis direction, and also comprises a stacked piezoelectric element in the present invention. However, the present invention is not limited to this. The Z direction fine moving mechanisms 112 are required in correspondence with the probe electrodes 101, and are independently position-controlled by a servo circuit 113.

A bias voltage application portion 114 is used for applying a bias voltage (to be referred to as a voltage $V_B$ hereinafter) between the probe electrode 101 and the record medium 102. A tunnel current amplification portion 115 detects and amplifies a tunnel current (to be referred to as a current $J_T$ hereinafter) flowing between the probe electrode 101 and the record medium 102. The height of the probe electrode 101 (the distance between the probe electrode 101 and a sample in the Z axis direction) is adjusted, so that the current $J_T$ to be detected has a proper value. A pulse source 118 is used for applying a voltage for recording or erasing information. When the probe electrodes 101 are scanned on a sample to observe (reproduce) a surface condition of the record medium 102 using the above-mentioned mechanism, the following two methods can be employed: (1) a method wherein the height of each probe electrode 101 is controlled to obtain a constant current $J_T$ to be detected, and a change in height of each probe electrode 101 is measured (to be referred to as a current constant mode hereinafter), and (2) a method wherein a change in current $J_T$ is measured when each probe electrode 101 is scanned while its height is fixed to be a constant value (to be referred to as a height constant mode hereinafter). When the mode (1) is selected, the heights (which need not always be absolute values) of the probe electrodes 101 are detected by a probe electrode height detecting portion 116 in units of probe units. The height signal is separated by a wave separator 117 into a height component based on a three-dimensional pattern and a change in electron state on the sample surface, and a component produced by the slope of the sample. The latter component is fed back to the X-Y axes slope driving circuit 107, and the slope of the record medium 102 on the sample table is corrected, so that the feedback component becomes almost zero (i.e., the amplitude becomes almost zero). A case will be exemplified in detail below wherein a highly oriented pyrolyric graphite (to be referred to as an HOPG hereinafter) member is used as the record medium, and correction in only one axis (X axis) direction is performed for the sake of simplicity.

Figure 8:
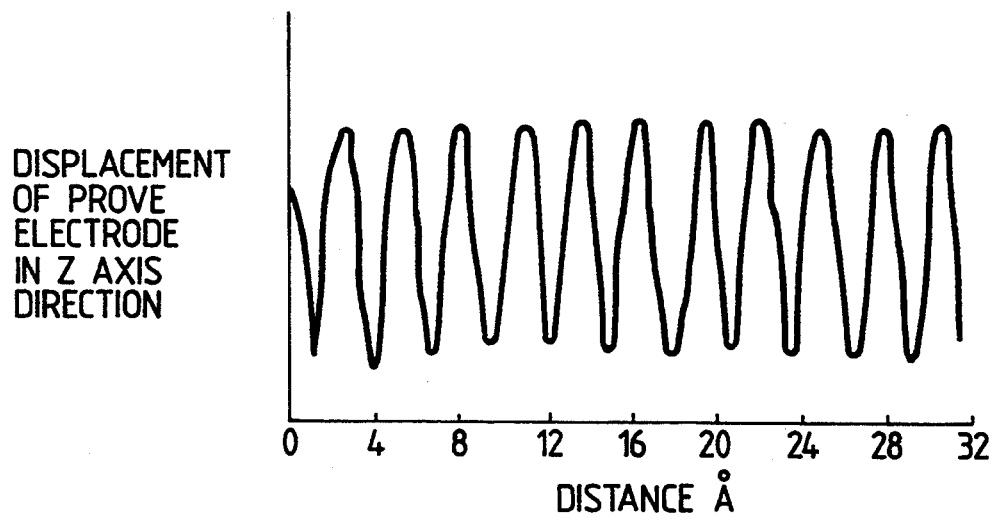
FIG. 8 is a graph showing an ideal signal waveform representing a change in height of a probe electrode, expected to be observed when an HOPG is observed using an STM.
Figure 9:
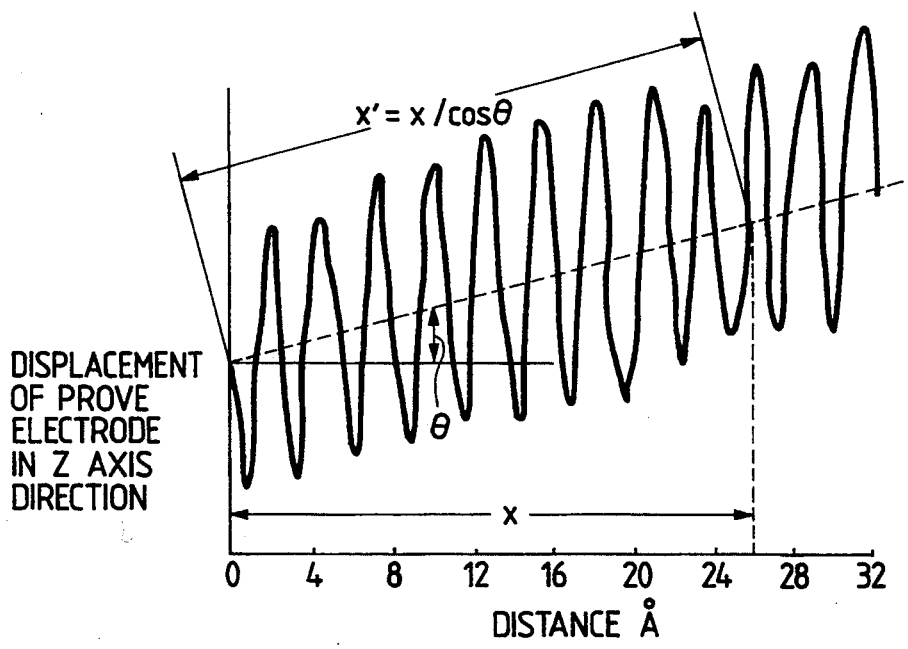
FIG. 9 is a graph showing the actually obtained signal waveform of a change in height of the probe electrode.
Figure 10:
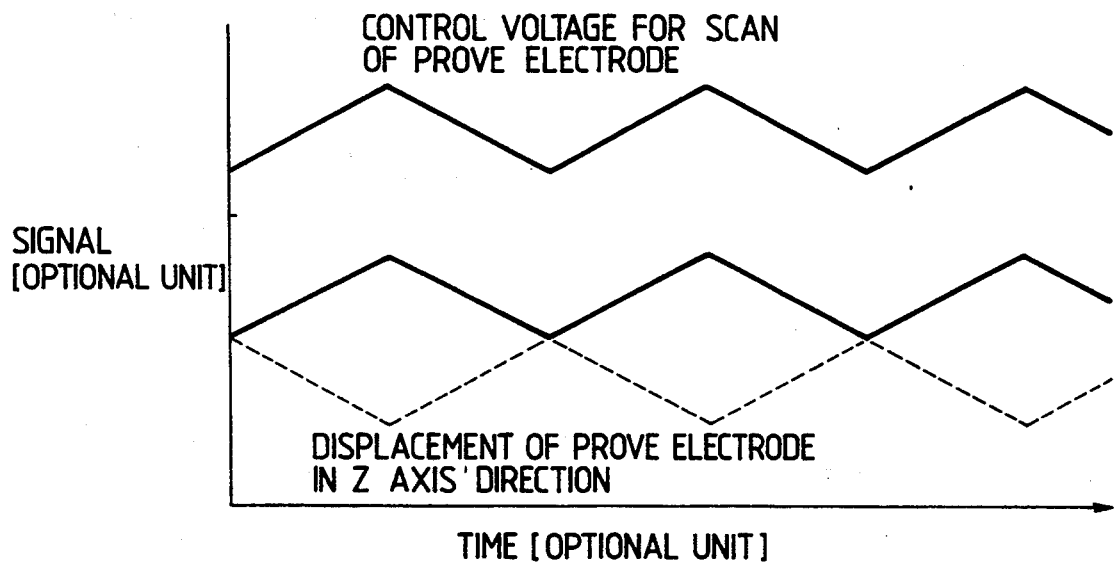
FIG. 10 is a graph showing changes, over time, in control voltage signal for scan of the probe electrode, and in displacement signal of the probe electrode in the Z axis direction when the probe electrode is reciprocally scanned on the HOPG.

When each probe electrode 101 is scanned along the X axis direction on the HOPG to have $V_B = 1$ V and $J_T = 1$ nA, the result shown in FIG. 8 should be obtained as a change in height (Z axis direction) of the probe electrode 101 in correspondence with the arrangement of carbon atoms constituting the HOPG. The pitch of a periodic structure in FIG. 8 is about 3 Å or less although it does not always coincide with a lattice distance since the X axis direction does not always extend along the crystal orientation of the HOPG. A displacement in the height (Z axis) direction is several Å. The above-mentioned result is obtained when the surface of the record medium 102 is parallel to the X axis. However, when the surface of the record medium 102 is sloped with respect to the X axis, a displacement of the probe electrode 101 in the Z axis direction is as shown in FIG. 9 while an angle defined between the surface (X' axis) of the record medium 102 and the X axis is represented by $\theta$. More specifically, a change in height caused by the slope of the record medium 102 is superposed on a change in height caused by the periodic structure of the atoms. It is not easy to process a signal in this state. Thus, a low-frequency component (a signal caused by the slope of the record medium) is cut using an electrical filter to extract a signal based on the periodic structure of the atoms. However, when the record medium 102 is sloped, the scan operation of the probe electrode 101 along the X axis by a distance x is equivalent to a scan operation over a length of $x' = x/\cos\theta$ along the X' axis on the surface of the record medium 102. Therefore, when the low-frequency component is cut from the obtained probe electrode height signal, information over the distance x' is undesirably compressed to that over the distance x. Therefore, distance dimensional accuracy is impaired, and as an information processing region becomes larger, the difference between a real space and a scan distance is increased. Furthermore, the total displacement of the probe electrode 101 in the Z axis direction caused by the slope of the sample at a point x is given by z=xtanθ. However, when the slope of the record medium 102 is large, and exceeds the Z axis direction fine-movement range of the probe electrode 101, it is impossible to perform continuous information processing. In order to solve this problem, according to the present invention, a probe electrode height signal (or an electrical signal to be fed back to the servo circuit 113 so as to maintain constant $J_T$) is divided into a plurality of frequency bands including an arbitrary frequency region using the wave separator 117. Of these frequency bands, a frequency (normally, the lowest frequency) as a result of the slope of the record medium 102 is selected, and the slope of the record medium 102 is corrected using the X-Y axes slope driving circuit 107, so that the amplitude at that frequency can become close to 0 as much as possible. More specifically, assuming that the probe electrode 101 is reciprocally scanned in the current constant mode within a predetermined section, a signal for scanning the probe electrode 101 is as shown in FIG. 10. FIG. 10 also illustrates the displacement of the probe electrode 101 in the Z axis direction in this case. The frequency of a signal component resulting from the slope of the record medium 102 is synchronized with that of the probe electrode scan signal. The amplitude of this signal component is detected as slope information, and correction is made in a direction to make the amplitude of this signal component approach zero using the mechanism 107. Depending on the direction of the slope of the record medium 102, a phase may be shifted by 180°, as indicated by a dotted line in FIG. 10. The initial scan operation need only be performed for a proper distance in correspondence with the size of an information processing region, and a scan operation for correcting the slope of the record medium 2, and a feedback operation to the X-Y axes slope driving circuit 107 may be executed several times, as needed. When the above-mentioned operation is performed also for the Y axis, the record medium surface (X'-Y' plane) and the probe electrode scan plane (X-Y plane) can be parallel to each other. A probe electrode height change signal obtained after the above-mentioned operation can have very high position dimensional accuracy in the X-Y directions.

When the record medium 102 is sloped upon selection of the height constant mode (2), the probe electrode 101 is too far from the record medium 102, and a current $J_T$ can no longer be detected, or the probe electrode 101 contacts the record medium 102. In order to avoid such situation, a signal is fed back to the servo circuit 113, so that the value $J_T$ can fall within a predetermined range. Thus, the height of the probe electrode is slowly changed even in the height constant mode. However, in this case, the dimensional accuracy may be impaired by the above-mentioned signal processing. In addition, arithmetic processing must be performed to attain feedback control. For this reason, an information reproduction speed is undesirably decreased. Furthermore, when an information processing region is large, the same problems as those in the current constant mode (1) are posed, i.e., a dimensional error is increased, and correction beyond the Z axis direction fine-movement range of the probe electrode 101 is impossible. Therefore, a $J_T$ change signal (normally, a signal obtained by amplifying the change signal using the tunnel current amplification portion 115) obtained upon a scan operation is divided into a plurality of frequency bands including an arbitrary frequency region using the wave separator 117 like in the mode (1). Of these frequency bands, a frequency (normally, the lowest frequency) as a result of the slope of the record medium 102 is selected, and the slope of the record medium 102 is corrected using the X-Y axes slope driving circuit 107, so that the amplitude at that frequency can become close to 0 as much as possible. The initial scan operation need only be performed for a proper distance in correspondence with the size of an information processing region, and a scan operation for correcting the slope of the record medium 2, and a feedback operation to the X-Y axes slope driving circuit 107 may be executed several times, as needed. When the above-mentioned operation is performed also for the Y axis, the record medium surface (X'-Y' plane) and the probe electrode scan plane (X-Y plane) can be parallel to each other. The $J_T$ change signal obtained after the above-mentioned operation can have very high position dimensional accuracy in the plane of the record medium (X-Y directions).

As described above, a signal (information reproduction signal) corresponding to the surface condition of the record medium 102 is wave-separated into arbitrary frequencies, and the amplitude of the separated signal component must be checked. In this operation, a lock-in amplifier may be utilized. More specifically, the wave separator 117 may comprise a lock-in amplifier. In the lock-in amplifier, the amplitude of a signal component at an arbitrary frequency in an input signal (in this case, a signal corresponding to the surface condition of a sample) can be checked, and the amplitude of an input signal component having a frequency of an input reference signal can be checked. Therefore, when a sweep signal of a probe is used as the reference signal, the degree of slope of the record medium 102 can be readily detected.

The X-Y axes slope mechanism 104 will be described below. The X-Y axes slope mechanism 104 may comprise any mechanism as long as it can finely and precisely control the slope of a sample in two axes. An X-Y axes slope stage or an X-Y axes goniometer is preferably used. The former mechanism is a three-point support stage, the length between at least two out of the three support points (the distance between a support surface and a stage) is variable, and the length is properly adjusted to change the slope of the stage surface. The length between the support points may be changed by, e.g., a mechanical method using a micrometer head or the like, or by utilizing a piezoelectric element. The latter mechanism is preferable since it can attain finer control although a variable amount is small. When an information processing region is very wide, it is often preferable to use the former mechanism. Furthermore, as one of very preferable methods, after the displacement on the X-Y axes slope stage is enlarged by a lever, control is made using a proper actuator. In the X-Y axes goniometer, two goniometers which can slope and rotate a stage are combined to be able to slope and rotate the stage in two axes.

Figure 11A:
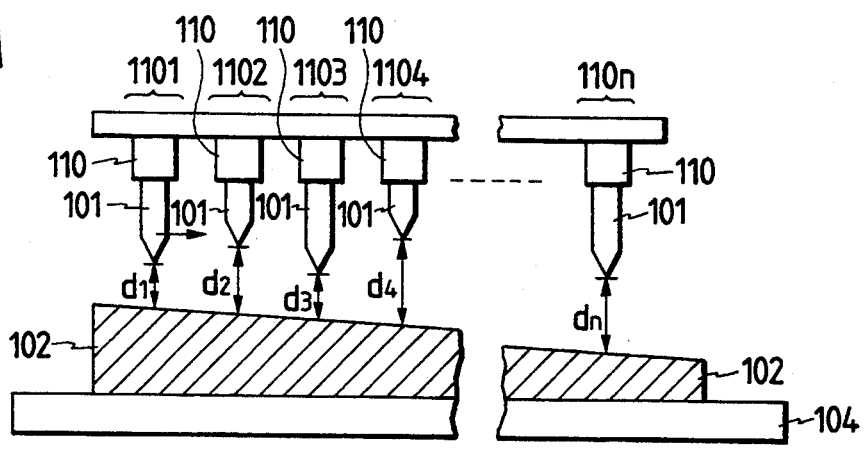
FIGS. 11A to 11C are views for explaining adjustment processes associated with the positions of multi-probe electrodes and a record medium in turn.
Figure 11B:
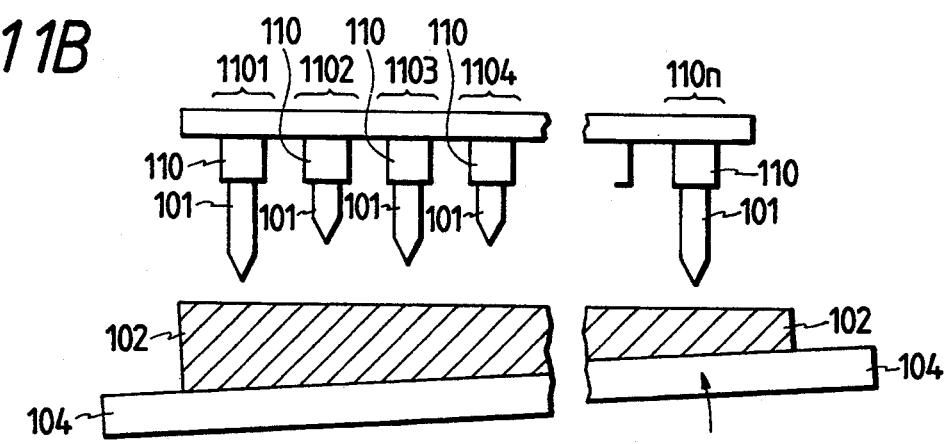
Figure 11C:
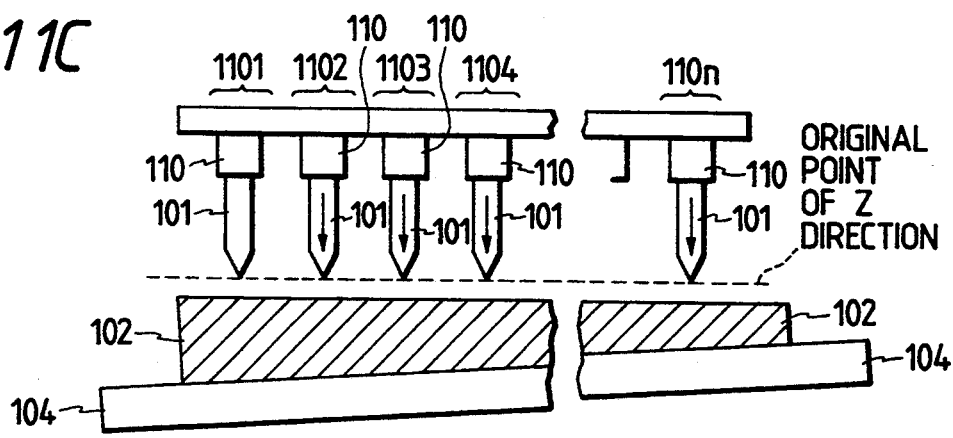

With the above-mentioned operations, the surface of the record medium 102 has a parallel positional relationship with the scan directions (X-Y directions) of the probe electrode 101. The probe electrodes 101 in all the probe units are adjusted, so that the current $J_T$ can have an arbitrary setting value (e.g., 0.1 nA) at a predetermined voltage $V_B$. The position of each probe electrode 101 in the Z axis direction in this Case is set as an original point. With these operations, all the information reproduction signals obtained through the probe electrodes 101, and all the pulse voltage signals applied to the record medium 102 through the probe electrodes 101 so as to record or erase information can become equivalent to each other. The series of operations described above will be briefly described in turn below with reference to FIGS. 11A to 11C. Assume that there are n (n is a natural number equal to or larger than 2) probe units 1101, 1102, 1103, 1104, ..., 110n. As shown in FIG. 11A, distances $d_1$, $d_2$, $d_3$, $d_4$, ..., $d_n$ between the record medium 102 and the probe electrodes 101 of the respective probe units 110n are not constant due to the slope of the record medium 102 and variations of the lengths of the probe electrodes 101. Of the probe units 110n, an arbitrary one probe unit (e.g., 1101) is scanned on an arbitrary section on the record medium 102, and the slope of the record medium 102 is corrected using a reproduction signal of a surface condition obtained at this time, as shown in FIG. 11B, so that the scan directions (X-Y directions) of the probe electrode 101 can become parallel to the surface of the record medium 102. In this case, it is preferable that the scan distance of the probe electrode 101 coincides with the size of an information processing region. The scan section may be gradually prolonged while executing the above-mentioned slope correction operation. In fact, this method must often be executed, for example, when the slope of the record medium 102 is considerable. Finally, as shown in FIG. 11C, the distances between the probe electrodes 101 and the record medium 102 are temporarily adjusted to be equal to each other in all the probe units 110n, and the positions in the Z axis direction of the probe electrodes 101 at that time are set as original points. When the positions in the Z axis direction of the probe electrodes 101 are directly corrected while omitting slope correction of the record medium 102, some probe electrodes 101 undesirably collide against or are separated too far from the record medium 102 when the probe electrodes 101 are scanned, i.e., in any of recording, reproduction, and erase operations of information, except for a case wherein the record medium 102 is fortunately not sloped. When feedback control is performed so as to avoid the above-mentioned problems, not only a decrease in information processing speed but also an increase in error associated with positions in the X-Y directions occurs, resulting in an increase in error rate associated with information processing.

The operations of the present invention have been described using the STM. The present invention is effective not only for a case wherein currents $J_T$ at respective points are measured, but also for an information processing apparatus or an information processing method, which utilizes the scan type tunnel spectroscopy (STS) for measuring $dJ_T/dV_B$ at respective points. The present invention can also be applied to information processing apparatuses or information processing methods, which utilize other SXMs using probe and sample driving mechanisms similar to those of the STM, for example, a scan type atomic force microscope (AFM) for measuring an atomic force acting between a probe and a sample, and performing feedback control to make constant the magnitude of the atomic force so as to obtain a structure of a sample surface, a scan type magnetic force microscope (MFM), in which a probe in the AFM is replaced with a probe formed of a ferromagnetic material such as Fe, Ni, or the like, or a probe formed of other materials and coated with the ferromagnetic material, and which measures a local magnetic force on a sample, a scanning ion conductance microscope (SICM), using a micro-pipette electrode as a probe, for measuring a sample surface structure in an electrolytic solution based on a change in ionic conductivity, a scan type acoustic microscope (STUM or STAM) for vibrating a probe by an ultrasonic wave, and measuring an acoustic wave generated in a sample by utilizing a change in amplitude or phase of the ultrasonic wave reflected by the sample surface and returning to the probe or according to the strength of an interatomic force acting between the probe vibrated by the ultrasonic wave and the sample surface, so as to measure a surface structure of the sample, a scan type near field optical microscope (NSOM), using an optical probe having a pinhole having a diameter smaller than the wavelength of light used, for detecting evanescent light produced on the sample surface upon illumination of the sample with an external light source using the optical probe so as to detect the surface structure of the sample, and the like.

Once the surface of the record medium 102 is set to be parallel to the scan plane of the probe, the probe can be prevented from colliding against the record medium 102 during a scan operation, or an operation for correcting the position in the Z direction of the probe can be simplified, resulting in high-speed information processing. In addition, since the accuracy for the positions of recorded bits can be greatly improved, recording, reproduction, and erase operations can be accurately performed.

According to the present invention, the record medium 102 used in these apparatuses and methods is not particularly limited. For example, in an information processing apparatus and an information processing method utilizing the STM, a record medium, in which a thin film having an electrical memory effect, e.g., a recording layer formed of a n-electron-conjugated organic compound, or a chalcogen compound, is deposited on a conductive substrate, as described in Japanese Patent Application Laid-Open Nos. 63-161552, 63-161553, and the like, may be used as the record medium 102. When such a record medium is used, a voltage exceeding a given threshold value is applied between a probe and a conductive substrate during a probe scan operation, and the conductivity of the recording layer immediately below the probe is locally changed, thus recording information. The recorded portion can be erased by applying a voltage exceeding the given threshold value. In other words, the conductivity can be restored to an original state. In a reproduction mode of recorded information, a difference in $J_T$ between a recorded portion and a non-recorded portion is detected using a probe voltage below the threshold value for causing the above-mentioned recording or erase operation while scanning the probe.

As the record medium 102, a material, in which a surface is locally melted or evaporated upon application of a voltage exceeding a given threshold value, and a surface condition is changed to a recessed or projecting state, e.g., a metal thin film of, e.g., Au, Pt, or the like, may be used. In any case, the surface of the record medium 102 is preferably as flat as possible excluding three-dimensional patterns which are artificially formed for tracking.

When information processing is performed using other SXM techniques, an easy way is to electrically perform recording, i.e., to use the STM, or to cause the probe to directly collide against the record medium 102 so as to perform recording using a mechanical change in pattern.

Sixth Embodiment

Figure 12:
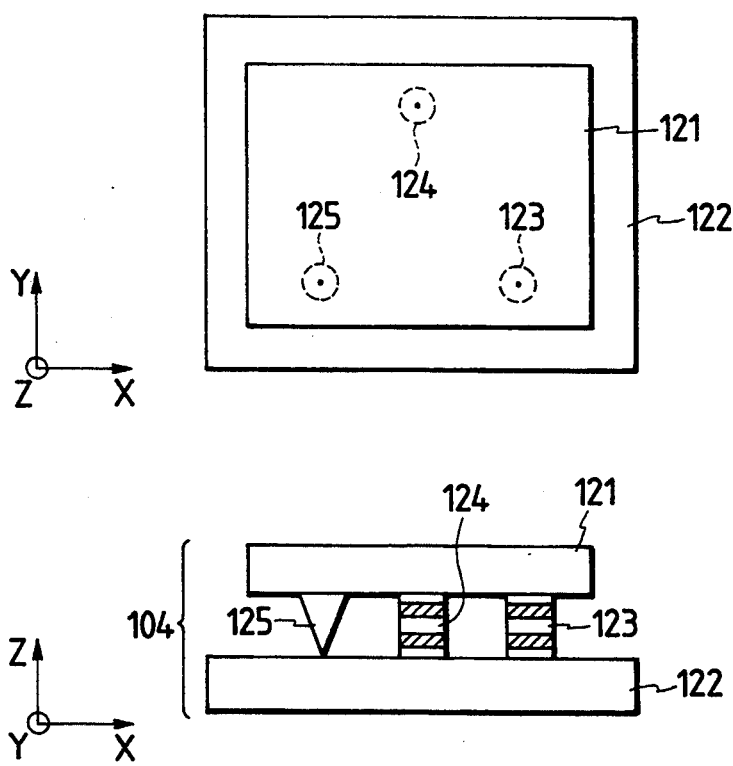
FIG. 12 is a view showing an example of an X-Y axes slope stage.

A recording/reproduction experiment was conducted using the information processing apparatus utilizing the STM shown in FIG. 6. As the probe electrode 101, an electrode obtained by electrolytically polishing an Au member having a diameter of 0.3 mm in HCl was used. As the X-Y axes slope mechanism 104, an X-Y axes slope stage shown in FIG. 12 was used. In FIG. 12, a stage 121 is supported on a reference surface 122 at three points. Of these support points, two points 123 and 124 comprise piezoelectric elements, and can change the distance between the reference surface 122 and the stage 121 on the order of Å. The remaining one support point 125 is formed to make a point contact with the reference surface 122, so as not to disturb free movement (slope) of the stage with respect to the movement of the piezoelectric elements. The three support points are arranged at the vertices of a regular triangle on the reference surface 122. In addition, the support point 125 and one (123) of the support points using the piezoelectric elements are arranged, so that a line defined therebetween is parallel to the X axis direction of the X-Y stage 103.

As the record medium 102, a medium prepared by depositing (substrate temperature=450°) a 5,000-Å thick Au layer on a cleaved mica substrate, was used.

Figure 13:
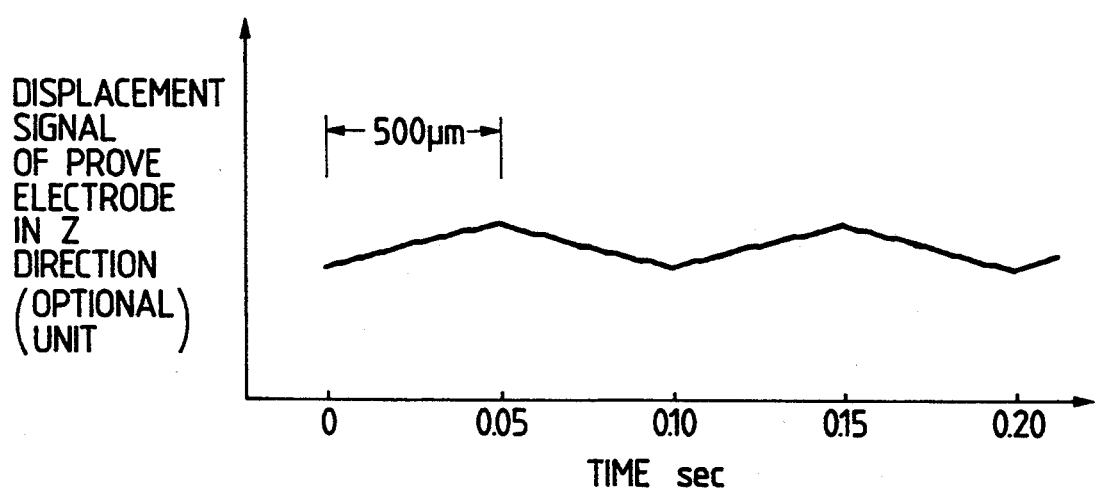
FIG. 13 is a graph showing a voltage signal waveform which is applied to a Z direction fine-movement mechanism, and is obtained when an Au surface is observed using the information processing apparatus using the STM.

After the Au record medium 102 was set on the X-Y axes slope stage, the probe electrode 101 of the probe unit 1101 was caused to approach the record medium 102 at a voltage $V_B=100$ mV (probe electrode bias), so that a current $J_T$ became 0.1 nA. The probe electrode 101 was reciprocally scanned in the X axis direction over a length of 500 μm at a sweep frequency of 10 Hz, while controlling the height of the probe electrode 101 using the servo circuit 113 so as to obtain constant $J_T$. FIG. 13 shows a voltage signal waveform applied to the Z direction fine moving mechanism 112 through the servo circuit 113 at that time. This signal was separated into components having a frequency equal to or lower than 10 Hz and components having a frequency exceeding 10 Hz through the lock-in amplifier 117. The height of the support point 123 was adjusted, so that the signal components having a frequency equal to or lower than 10 Hz became almost zero, while continuing the sweep operation of the probe electrode 101 of the probe unit 1101.

Similarly, the probe electrode 101 of the probe unit 1101 was swept at a sweep frequency of 10 Hz in the Y axis direction. The height of the support point 124 was adjusted, so that frequency components equal to or lower than 10 Hz of a voltage signal applied to the Z direction fine moving mechanism 112 at that time became almost zero.

The distances between the record medium 102 and the probe electrodes 101 of both the probe units 1101 and 1102 were controlled by the Z direction fine moving mechanism 112 so as to yield $V_B=100$ mV and $J_T=0.1$ nA, and the positions in the Z axis direction of the probe electrodes 101 at that time were set as original points. After the above-mentioned operations, a voltage of +0.4 V having a pulse width of 300 nsec was applied from the pulse source 118 at an arbitrary position (to be referred to as a point A hereinafter) on the record medium 102 while the height of the probe electrode 101 of the probe unit 1101 was kept constant. Thereafter, when a 300-Å square region having the voltage application point as the center was observed in the current constant mode, it was confirmed that a projection having a diameter of 100 Å and a height of 20 Å was formed, and recording was successful. Next, information was recorded by the same method as described above at a position (to be referred to as a point B hereinafter) separated by −50 μm from the point A in the X direction. Thereafter, it was confirmed by the same method as described above in turn at a point C separated by 50 μm from the point B in the Y direction, and at a point D separated by −50 μm from the point C in the X direction that recording could be satisfactorily performed. When the probe electrode 101 was moved to a position separated by −50 μm from the point D in the Y direction, it was confirmed that recording had already been performed at that position. More specifically, the probe electrode 101 was correctly returned to the original point A, and it was demonstrated that the dimensional accuracy in position control was very high. Furthermore, when the same experiment was conducted using the probe unit 1102, it was also confirmed that recording/reproduction allowing excellent position control could be performed like in the case using the probe unit 1101. When information was recorded/reproduced by simultaneously using the probe units 1101 and 1102, it was demonstrated that the dimensional accuracy in position control was high like in the cases wherein these units were independently used.

Seventh Embodiment

A recording/reproduction experiment was conducted using the information processing apparatus utilizing the STM shown in FIG. 6 like in the sixth embodiment. Differences from the sixth embodiment will be described below. As the probe electrode 101, an electrode prepared by electrolytically polishing a W member having a diameter of 0.3 mm, and then, depositing a 1,000-Å thick Pd layer on the polished member, was used.

As the record medium 102, a medium prepared by stacking a six-layered polyimide (to be abbreviated to as PI hereinafter) Langmuir-Blodgett (to be abbreviated to as LB hereinafter) film on an electrode substrate obtained by epitaxially depositing (substrate temperature =450° C.) a 2,500-Å thick Au layer on a cleaved mica substrate, was used. A method of preparing the PI-LB film will be described below.

After polyamic acid given by formula (1) was dissolved (monomer-converted concentration=$1\times10^{-3}$M) in an N,N-dimethylacetoamide solvent, the resultant solution was mixed at a ratio of 1:2 (v:v) with an N,N-dimethyloctadecylamine solution ($1\times10^{-3}$M) separately prepared by using the same solvent as described above, thereby preparing a polyamic acid octadecylamine salt (to be referred to as PAAD hereinafter) solution given by formula (2). The PAAD solution was developed on a water phase of pure water at a water temperature of 20° C. so as to remove the solvent by evaporation. Thereafter, a surface pressure was increased up to 25 mN/m to form a PAAD monomolecular film (monolayer) on the water surface. The above-mentioned Au substrate was slowly dipped in a direction to cross the water surface at a rate of 5 mm/min, and was then slowly pulled up at the same rate, thereby forming a two-layered PAAD-LB film. Furthermore, these operations were repeated to form a six-layered PAAD-LB film.

The epitaxial Au substrate on which the six-layered PAAD-LB film was stacked was subjected to a heat treatment at 300° C. for ten minutes so as to convert PAAD into a polyimide, thus obtaining a six-layered PI-LB film given by formula (3). A recording/reproduction experiment was conducted using the record medium 102 prepared as described above.

zero, while continuing the sweep operation of the probe electrode 101 of the probe unit 1101.

Similarly, the probe electrode 101 of the probe unit 1101 was swept at a sweep frequency of 10 Hz in the Y axis direction. The height of the support point 124 was adjusted, so that frequency components equal to or lower than 10 Hz of a voltage signal applied to the Z

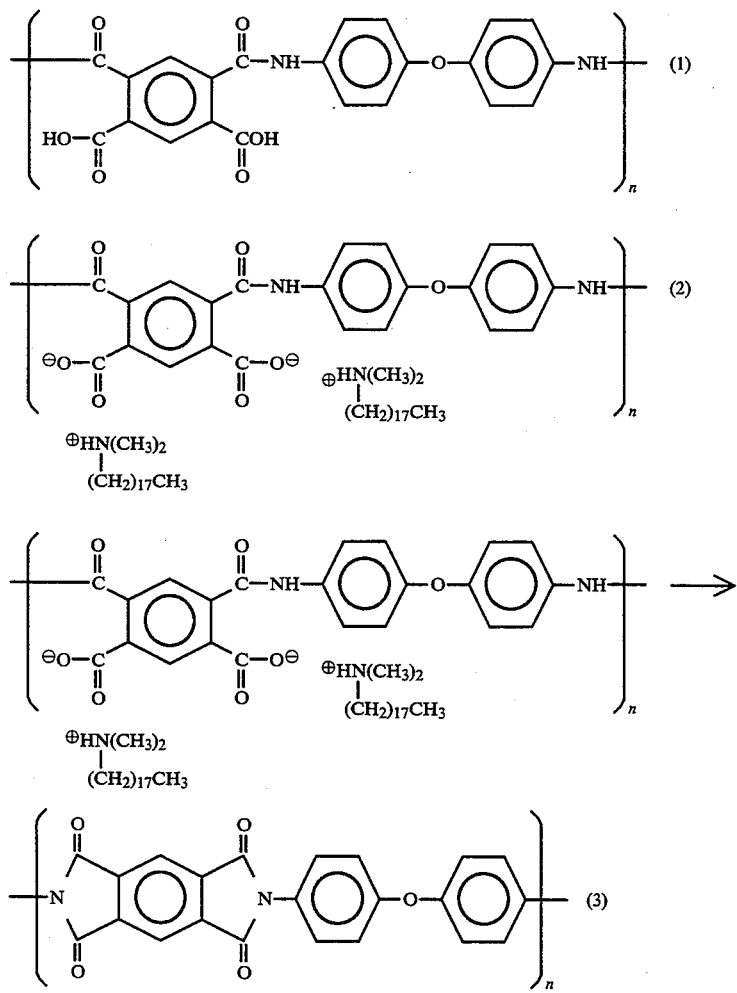

After the record medium 102 prepared by stacking the six-layered PI-LB film on the epitaxial Au substrate was set on the X-Y stage 103, the probe electrode 101 of the probe unit 1101 was caused to approach the record medium 102 using the Z direction fine moving mechanism 112 at a voltage $V_B=300$ mV (probe electrode bias), so that a current $J_T$ became 0.1 nA. The probe electrode 101 was reciprocally scanned in the X axis direction over a length of 500 μm at a sweep frequency of 10 Hz, while controlling the height of the probe electrode 101 using the servo circuit 113 so as to obtain constant $J_T$ (i.e., the current constant mode). A voltage signal waveform applied to the Z direction fine moving mechanism 112 through the servo circuit 113 at that time was the same as that shown in FIG. 13. This signal was separated into components having a frequency equal to or lower than 10 Hz and components having a frequency exceeding 10 Hz through the lock-in amplifier 117. The height of the support point 123 was adjusted, so that the signal components having a frequency equal to or lower than 10 Hz became almost direction fine moving mechanism 112 at that time became almost zero.

The distances between the record medium 102 and the probe electrodes 101 of both the probe units 1101 and 1102 were controlled by the Z direction fine moving mechanism 112 so as to yield $V_B=300$ mV and $J_T=0.1$ nA, and the positions in the Z axis direction of the probe electrodes 101 at that time were set as original points. After the above-mentioned operations, a pulse voltage shown in FIG. 14 was applied from the pulse source 118 at an arbitrary position (to be referred to as a point A hereinafter) on the record medium 102 while the height of the probe electrode 101 of the probe unit 1101 was kept constant. Thereafter, when a 300-Å square region having the voltage application point as the center was observed in the height constant mode, $J_T=3$ nA was attained over a 50-Åφ region having the pulse application region as the center with the above-mentioned operation. Thus, it was demonstrated that the PI-LB film transited from a high-resistance state having $J_T=0.1$ nA (to be referred to as an OFF state) to a low-resistance state (to be referred to as an ON state), and recording was performed. Next, information was recorded by the same method at a position (to be referred to as a point B hereinafter) separated by 50 μm from the point A in the X direction. Thereafter, it was confirmed by the same method as described above in turn at a point C separated by 50 μm from the point B in the Y direction, and at a point D separated by −50 μm from the point C in the X direction that recording could be satisfactorily performed. When the probe electrode 101 was moved to a position separated by −50 μm from the point D in the Y direction, it was confirmed that recording had already been performed at that position (ON state). More specifically, the probe electrode 101 was correctly returned to the original point A, and it was demonstrated that the dimensional accuracy in position control was very high.

Furthermore, when the same experiment was conducted using the probe unit 1102, it was also confirmed that recording/reproduction allowing excellent position control could be performed like in the case using the probe unit 1101. When information was recorded/reproduced by simultaneously using the probe units 1101 and 1102, it was demonstrated that the dimensional accuracy in position control was high like in the cases wherein these units were independently used.

Figure 15:
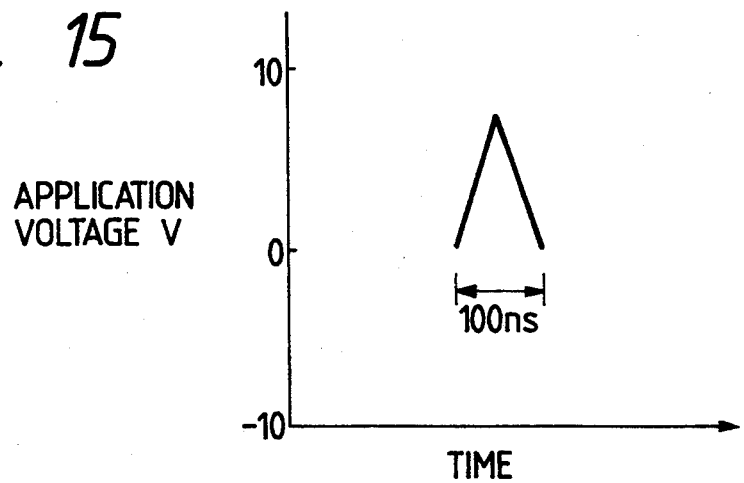
FIG. 15 is a graph showing a pulse voltage waveform to be applied to switch the PI-LB film from the ON state to an OFF state.

When a pulse voltage shown in FIG. 15 was applied after the probe electrode was moved to the recorded point (ON state region), it was confirmed that the recorded information was erased, and the corresponding portion transited to an OFF state (i.e., $J_T=0.1$ nA).

Eighth Embodiment

Figure 16:
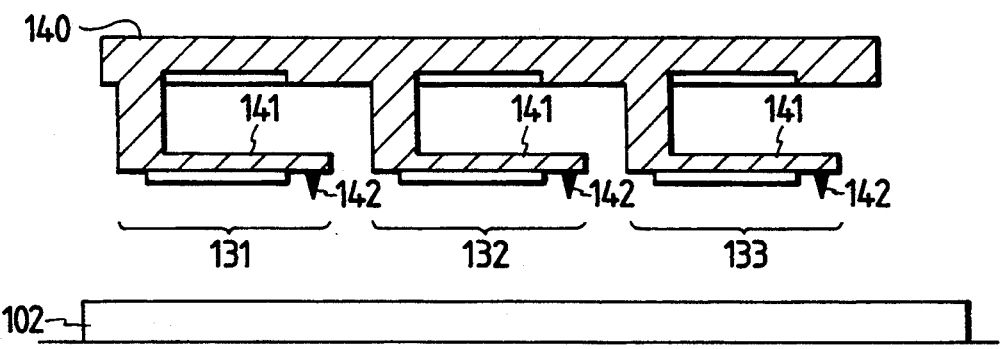
FIG. 16 is a sectional view showing a structure of a multi-cantilever probe used in the eighth embodiment of the present invention.

A recording/reproduction experiment was conducted following the same procedures as in the sixth embodiment, except that a multi-cantilever probe shown in FIG. 16 was used in place of the probe units 1101 and 1102 in the sixth embodiment.

The multi-cantilever probe will be described below. Cantilever units 131, 132, and 133 are formed on a silicon substrate 140. The silicon substrate 140 can be scanned in the X-Y directions by the X-Y directions fine moving mechanism 110. Each cantilever unit comprises a cantilever 141, and an electrode tip 142 as a probe electrode arranged at the distal end of the cantilever 141. The position in the Z axis direction of each electrode tip 142, i.e., the distance between the electrode tip 142 and the record medium 102, can be independently controlled by the corresponding cantilever 141. The cantilever 141 is a piezoelectric element bimorph having a multilayered structure of a metal electrode and a ZnO dielectric, and having a width of 50 μm and a length of 300 μm. A method of preparing the cantilever 141 will be described below with reference to FIGS. 17A to 17F.

Figure 17A:
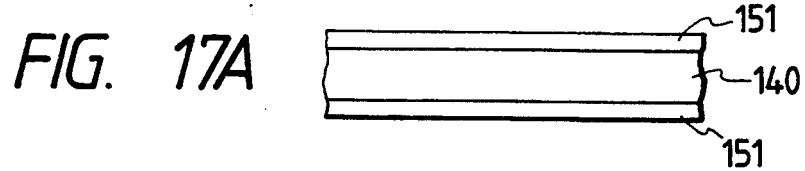
FIGS. 17A to 17F are sectional views for explaining manufacturing processes of a cantilever unit used in the multi-cantilever probe in turn.
Figure 17B:
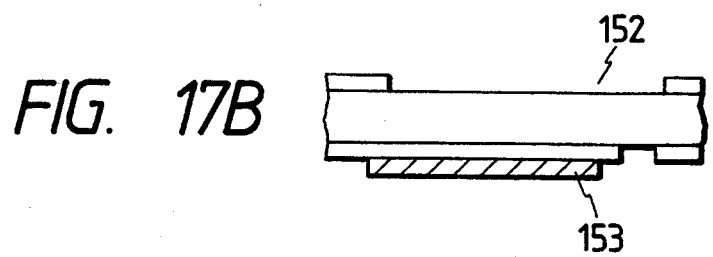
Figure 17C:
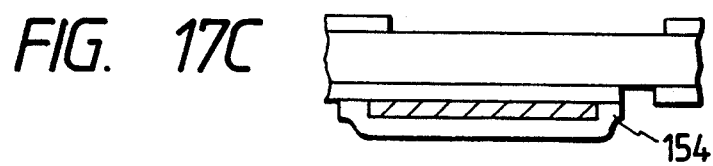
Figure 17D:
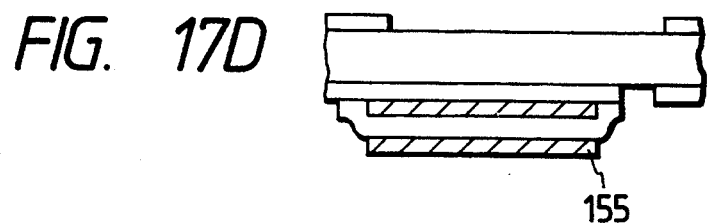
Figure 17E:
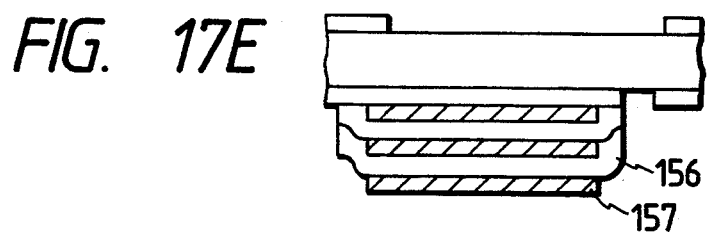
Figure 17F:
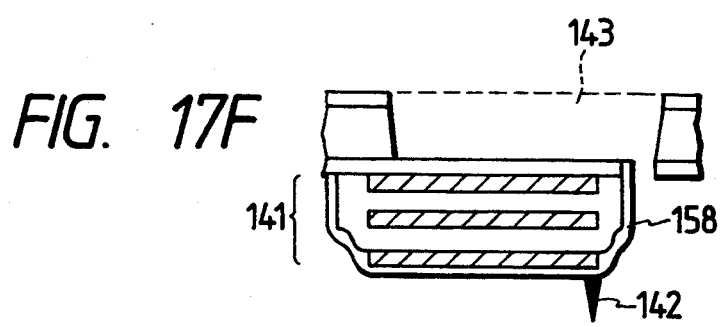

As shown in FIG. 17A, 500-nm thick silicon nitride films 151 were formed as insulating films on the surfaces of a silicon substrate 140 by high-frequency sputtering. Formation processes were executed as shown in FIGS. 17B to 17E. More specifically, an opening portion 152 (width=1 μm) was formed in the silicon nitride film 151 through a photolithography process. Thereafter, an Au undercoating electrode 153 having a Cr base layer, a ZnO layer (film thickness=1.2 μm) 154 formed by high-frequency sputtering, an Au-Zn intermediate electrode 155, a ZnO layer (film thickness =1.2 μm) 156 formed by the same method as described above, and an Au upper electrode 157 were sequentially stacked on the silicon nitride film 151. The overall bimorph element formed as described above was coated with a protective layer 158 formed of a silicon nitride film deposited by a sputtering method, as shown in FIG. 17F. Thereafter, an electrode tip 142 having a conical projection formed of deposited Au was formed. Subsequently, the silicon substrate 140 was anisotropically etched using a KOH aqueous solution as an etchant, thus forming a hole 143 in the opening portion 152.

Recording/reproduction operations were performed using the multi-cantilever probe manufactured as described above following the same procedures as in the sixth embodiment. As a result, it was confirmed that the dimensional accuracy in position control was satisfactory.

Ninth Embodiment

A recording/reproduction experiment was conducted following the same procedures as in the sixth embodiment, except that an X-Y axes goniostage was used as the X-Y axes slope mechanism 104 in place of the X-Y axes slope stage in the seventh embodiment. As a result, it was confirmed that the dimensional accuracy in position control was satisfactory.

Tenth Embodiment

Figure 18:
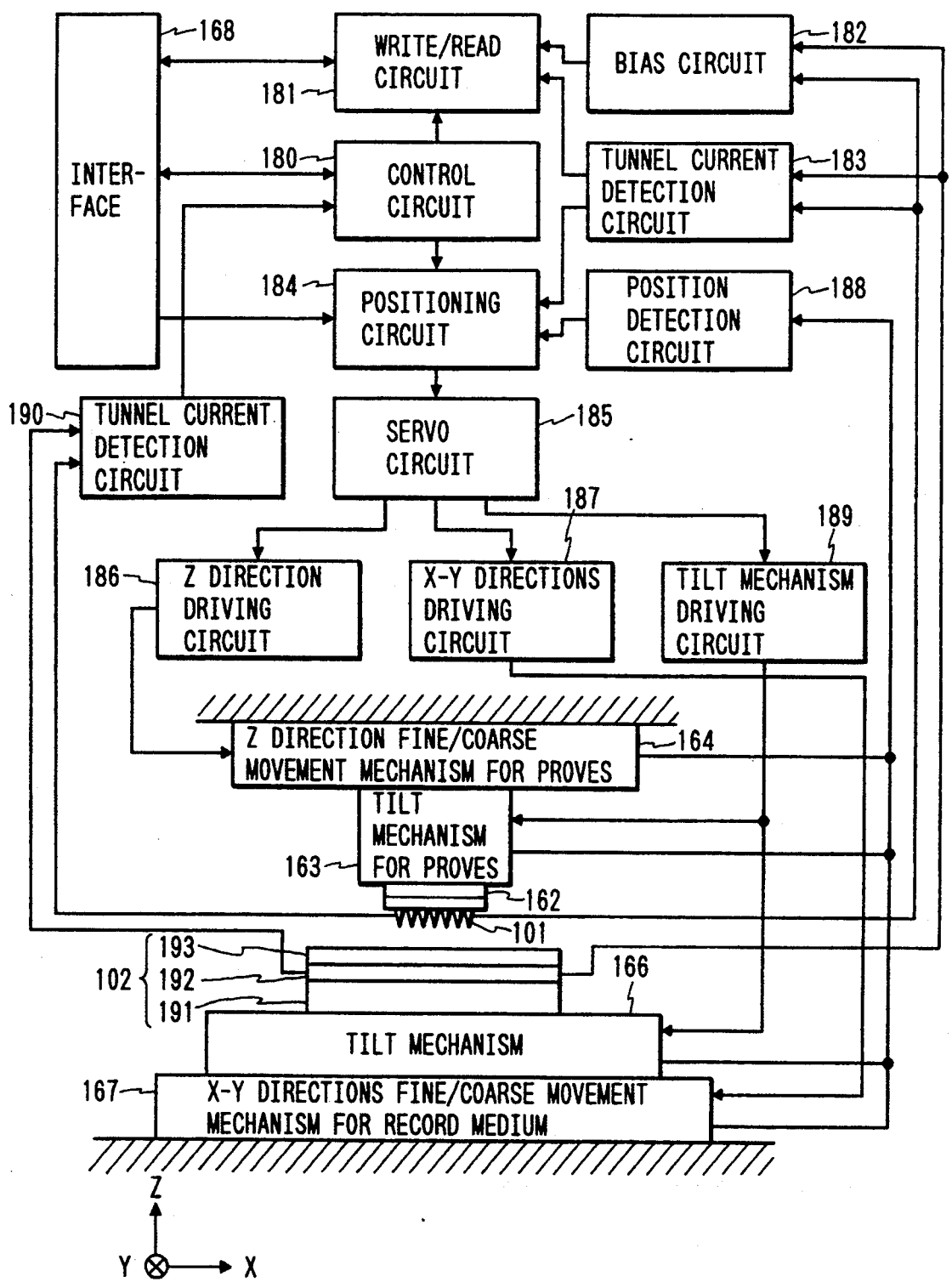
FIG. 18 is a schematic block diagram of an information processing apparatus, which can use a plane aligning method for a plurality of probes according to the tenth embodiment of the present invention.

FIG. 18 is a view best illustrating the characteristic feature of an information processing apparatus, which can use a plane aligning method of the present invention. The apparatus shown in FIG. 18 includes a plurality of probe electrodes 101 formed by the micromechanics technique, a probe electrode attachment 162 used for setting the plurality of probe electrodes on a tilt mechanism, a tilt mechanism 163 for changing the slope of the plurality of probe electrodes, and a Z direction fine/coarse movement mechanism 164 for finely/coarsely moving the plurality of probe electrodes in the Z direction. A record medium 102 comprises a substrate 191 obtained by polishing glass, an undercoating electrode 192 formed by depositing a Cr layer (base layer) and an Au layer on the substrate 191 by a vacuum deposition method, and a graphite (HOPG) recording layer 193. The recording layer 193 is adhered to the upper portion of the undercoating electrode 192 through a conductive adhesive. An information processing region on the surface of the recording layer 193 is flat on the atomic order by cleavage. The apparatus also includes a tilt mechanism 166 for changing the slope of the record medium 102, and an X-Y directions fine/coarse movement mechanism 167 for finely/coarsely moving the record medium 102 in the X-Y directions. An interface 168 is used for connecting the information processing apparatus with an external apparatus, and performs input/output operations of write/read information, output operations of status data, input operations of control signals, and output operations of address signals. The apparatus further includes a control circuit 180 for concentrically controlling operations among the respective blocks in the information processing apparatus, a write/read circuit 181 for writing/reading write/read information (data) upon an instruction from the control circuit 180, a bias circuit 182 for applying a write pulse voltage between the plurality of probe electrodes 101 and the record medium 102 in response to an instruction signal from the write/read circuit so as to write data, and for applying a read voltage, a tunnel current detection circuit 183 for detecting a current flowing between the plurality of probe electrodes 101 and the record medium 102 in a recording/reproduction mode, a positioning circuit 184 for determining the positions of the plurality of probe electrodes 101 and the record medium 102 on the basis of signals from the tunnel current detection circuit 183 and a position detection circuit 188 in response to an instruction from the control circuit 180, a servo circuit 185 for servo-controlling the positions of the plurality of probe electrodes 101 and the record medium 102 on the basis of a servo signal from the positioning circuit 184, a Z direction driving circuit 186 for driving the Z direction fine/coarse movement mechanism 164 for the plurality of probe electrodes 101 according to a signal from the servo circuit 185, an X-Y directions driving circuit 187 for driving the X-Y directions fine/coarse movement mechanism 167 for the record medium 102 according to the signal from the servo circuit 185, a tilt mechanism driving circuit 189 for driving the tilt mechanisms 163 and 166 according to the signal from the servo circuit 185, and a tunnel current detection circuit 190, used when the plurality of probe electrodes 101 are caused to approach the record medium 102, for detecting a tunnel current flowing through the probe electrodes 101. FIG. 18 illustrates one each of the control circuit 180, the write/read circuit 181, the bias circuit 182, and the tunnel current detection circuit 183. However, these circuits are used in correspondence with the number of the plurality of probe electrodes. In this embodiment, a cantilever type probe shown in FIG. 16 is used.

Figure 19:
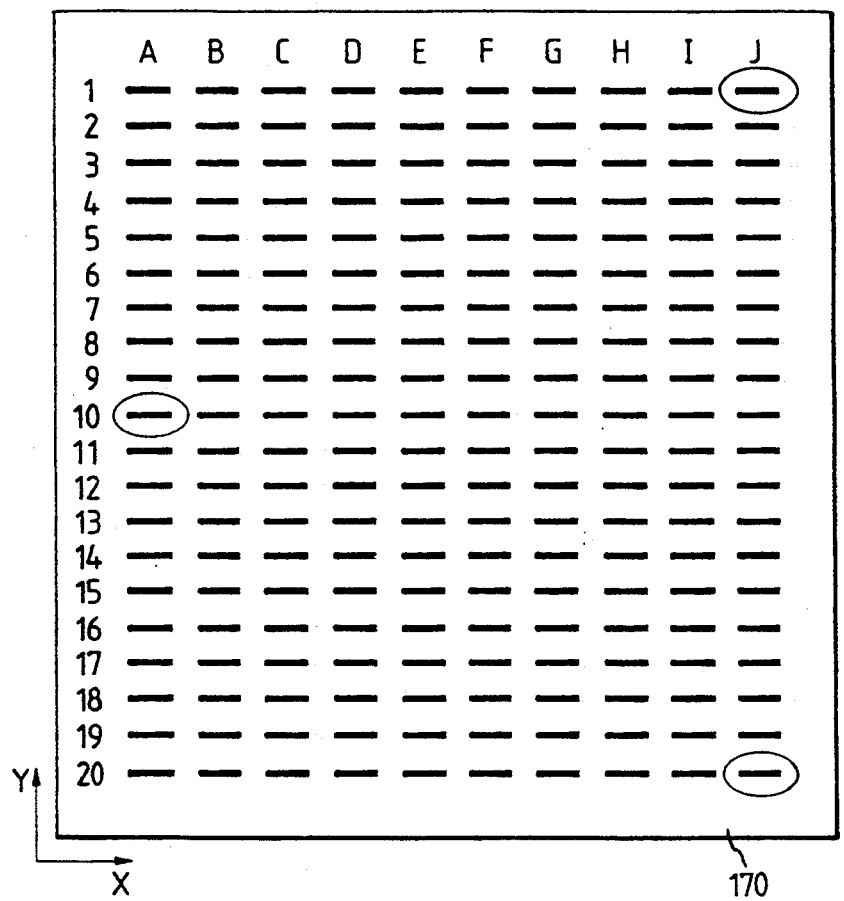
FIG. 19 is a top view of a plurality of probe electrodes used in the plane aligning method of the tenth embodiment.

FIG. 19 is a top view of a substrate for the plurality of probe electrodes used in this embodiment. In a structure shown in FIG. 19, i.e., 10×20 probe electrodes 101, i.e., a total of 200 probe electrodes 101 are arranged in the X and Y directions. Each probe electrode 101 is connected to wiring lines for detecting a tunnel current from the electrode tip 142 or for applying a voltage for recording a recording signal on the recording layer 193. These wiring lines are connected to the tunnel current detection circuit 183 and the bias circuit 182. The plurality of electrodes are arranged on a substrate 170. Line numbers of the probe electrodes are printed on the left side portion (FIG. 19) on the substrate 170, and column codes are printed on the upper side portion (FIG. 19). In this embodiment, three probe electrodes (those arranged at (10, A), (1, J), and (20, J); indicated by ellipses) are used for adjusting the positions in the Z direction.

Figure 20:
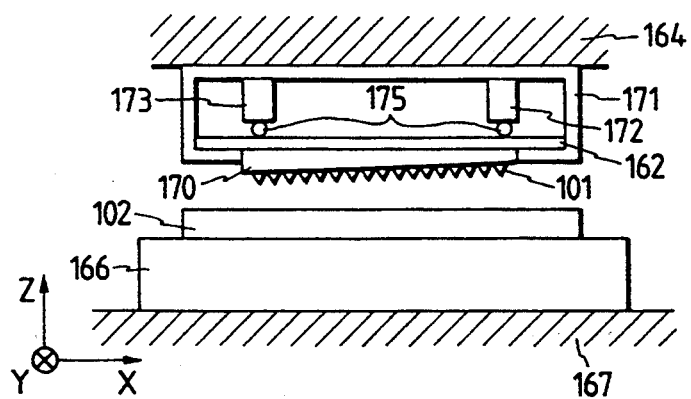
FIG. 20 is a sectional view of a tilt mechanism.

The plurality of probe electrodes shown in FIG. 19 are attached to an apparatus shown in FIG. 20. The probe electrodes are attached to the apparatus by adhering the substrate 170 for the plurality of probe electrodes to the probe electrode attachment 162 using an adhesive. Connections among the probe electrodes 101, the tunnel current detection circuits 183, and the bias circuits 182 are attained by connectors. The tilt mechanism 163 is constituted by a leaf spring 171 for fixing the probe electrode attachment 162, stacked piezoelectric elements 172 to 174 (FIG. 20 does not illustrate the piezoelectric element 174), and steel balls 175 for concentrating the weights of the stacked piezoelectric elements to one point. The stacked piezoelectric elements 172 to 174 are arranged to expand/contract in the Z axis direction. One end in the expansion/contraction directions of each piezoelectric element is fixed to the leaf spring 171 through an adhesive, and the other end is in contact with the steel ball 175. The three stacked piezoelectric elements 172 to 174 are respectively arranged immediately above three Z direction position adjustment probe electrodes (10, A), (1, J), and (20, J).

The apparatus used in this embodiment fixes the plurality of probe electrodes 101 in the X-Y directions, and finely moves the record medium 102 in the X-Y directions.

In the following embodiments, a plane drawn by one point on the record media 102 upon driving operation of the X-Y directions fine/coarse movement mechanism 167 is defined as a scan plane (X-Y plane).

The plane aligning method will be described in detail below.

First, a plane aligning operation between the plurality of probe electrodes 101 and the surface (X'-Y' plane) of the record medium 102 is performed.

The plurality of probe electrodes 101 are obliquely fixed to the probe electrode attachment 162, so that the Z direction position adjustment probe electrode (10, A) approaches the record medium 102 first. A voltage of 1 mV is applied to the Z direction position adjustment probe electrodes (10, A), (1, J), and (20, J) to displace their cantilevers by 1 nm toward the record medium 102, and a bias voltage of 0.5 V is applied between the probe electrodes 101 and the record medium 102.

Plane correction in the X direction is performed.

Figure 21A:
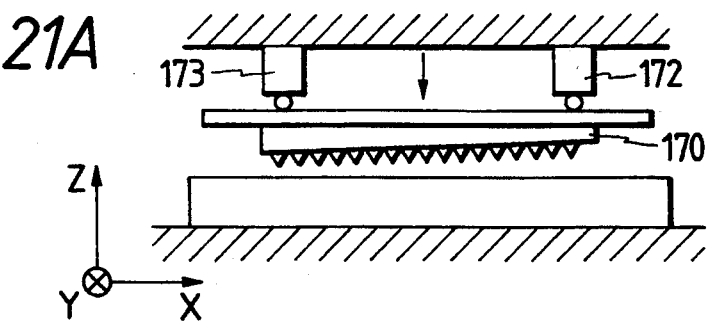
FIGS. 21A to 21D are sectional views for explaining the plane aligning method.
Figure 21B:
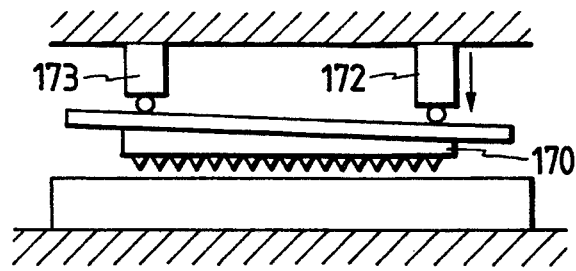

As shown in FIG. 21A, the Z direction position adjustment probe (10, A) is moved by the Z direction coarse movement mechanism to a position where it can detect a tunnel current of about $10^{-8}$ A. Then, as shown in FIG. 21B, the stacked piezoelectric element 172 is caused to expand so as to move the Z direction position adjustment probe electrode (1, J) until this electrode can detect a tunnel current equal to that detected by the Z direction position adjustment probe (10, A). When a voltage to be applied to the stacked piezoelectric element 172 is increased to 100 mV (about 10 nm in terms of displacement), the Z direction position adjustment probe electrode (1, J) can detect a tunnel current equal to that detected by the Z direction position adjustment probe electrode (10, A).

Figure 21C:
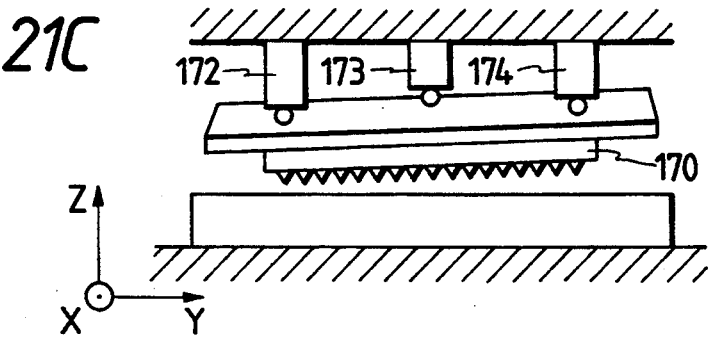

Then, plane correction in the Y direction is performed, as shown in FIG. 21C.

Figure 21D:
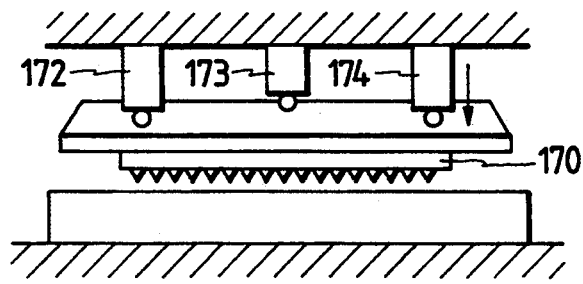

As shown in FIG. 21D, the stacked piezoelectric element 174 is caused to expand so as to move the Z direction position adjustment probe electrode (20, J) until this electrode can detect a tunnel current equal to that detected by the Z direction position adjustment probe electrode (10, A). When a voltage to be applied to the stacked piezoelectric element 174 is increased to 50 mV (about 5 nm in terms of displacement), the Z direction position adjustment probe electrode (20, J) can detect a tunnel current equal to that detected by the Z direction position adjustment probe electrode (10, A).

A voltage applied to the Z direction position adjustment probes (1, J) and (20, J) is set to be 0 V to restore the displacements of their cantilevers.

Figure 22:
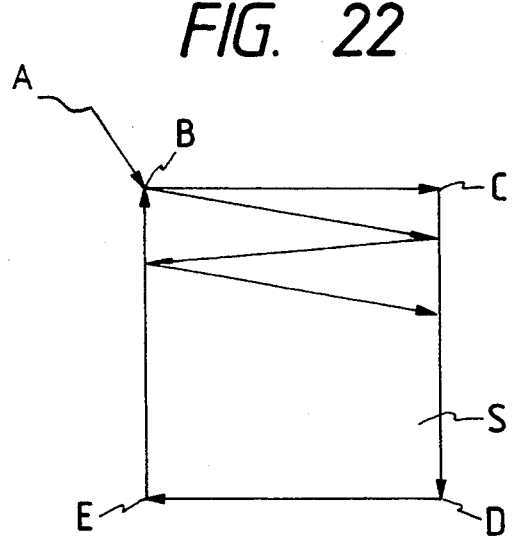
FIG. 22 is a view showing a scan path of a probe electrode on a recording region.

A plane aligning operation between the surface (X'-Y' plane) of the record medium 102 and the scan plane (X-Y plane) is then performed (FIG. 22).

At an arbitrary point A on the record medium 102, the Z direction position adjustment probe electrode (10, A) of the plurality of probe electrodes 101 is moved close to a tunnel region. The probe electrode 101 is moved to a point B on one corner of a recording region S while controlling the vertical distance of the Z direction position adjustment probe electrode (10, A). The probe electrode 101 is relatively moved along the outer periphery of the recording region S from the point B to points C, D, and E in turn by moving the medium while maintaining the constant tunnel region.

Figure 23:
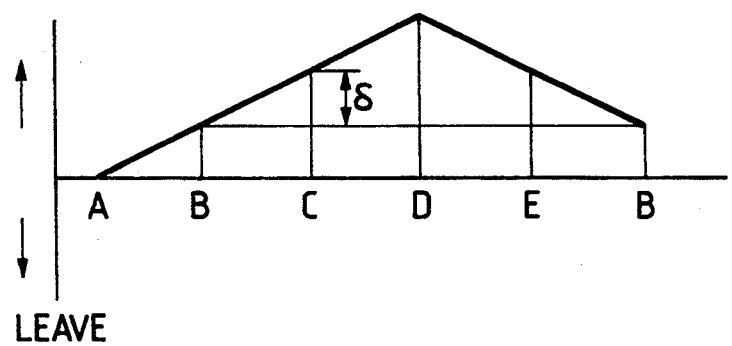
FIG. 23 is a graph showing a control amount in the vertical direction of a probe electrode.

FIG. 23 shows a vertical control amount of the probe electrodes 101 when the probe electrodes 101 are moved along the outer periphery of the recording region S. In FIG. 23, the vertical control amount of the probe electrodes 101 with reference to the point A in FIG. 22 is plotted along the ordinate. Control for moving the probe electrodes 101 in a direction to approach the record medium 102 is made from the point A to the point D. Control for moving the electrodes in a direction to separate from the record medium 102 is made from the point D to the point B. More specifically, in the above-mentioned case, as can be seen from FIG. 23, the surface (X'-Y' plane) of the record medium 102 is sloped with respect to the scan plane (X-Y plane) of the probe electrode 101, so that the point A is closest to the scan plane, the point B is second closest to the scan plane, the points C and E are third closest to the scan plane, and the point D is farthest from the scan plane.

From this result, the slopes of the surface (X'-Y' plane) of the record medium 102, and the plurality of probe electrodes 101 are changed while maintaining a parallel state between the plurality of probe electrodes 101 and the surface of the record medium 102, thereby performing the plane aligning operation with the scan plane (X-Y plane). With the above-mentioned operations, a plane defined by, e.g., the tips of the plurality of probe electrodes, i.e., a plurality of probe electrode planes (X''-Y'' planes), the record medium surface (X'-Y' plane), and the scan plane (X-Y plane) can become parallel to each other.

In this state, a recording experiment was conducted by driving the X-Y directions fine movement mechanism, and applying a triangular wave of ±10 V between an arbitrary tunnel tip and the substrate electrode. In this case, the tip could be prevented from contacting the record medium, and information could be satisfactorily recorded/reproduced.

In this embodiment, when the plane aligning operation between the plurality of electrode probes 101 and the record medium 102 is performed, three probe electrodes are used as the Z direction position adjustment probe electrodes. Alternatively, four probe electrodes at four corners may be used. In addition, the order of the plane aligning operations is not limited. For example, the plane aligning operation in the X direction may be performed after the plane aligning operation in the Y direction is completed.

When the surface (X'-Y' plane) of the record medium 102 is aligned with the scan plane (X-Y plane), the Z direction position adjustment probe electrode (10, A) of the plurality of probe electrodes 101 is used as a sensor. However, an arbitrary probe electrode may be used. For example, when the Z direction position adjustment probe electrode (1, J) was used as a sensor, the same result as described above could be obtained.

Eleventh Embodiment

In the tenth embodiment, the plane aligning operation between the scan plane (X-Y plane) and the surface (X'-Y' plane) of the record medium 102 is performed after the plane aligning operation between the plurality of probe electrodes 101 and the surface (X'-Y' plane) of the record medium 102 is performed. In this embodiment, the plane aligning operation between the scan plane (X-Y plane) and the surface (X'-Y' plane) of the record medium 102 is performed, and then, the plane aligning operation between the plurality of probe electrodes 101 and the surface (X'-Y' plane) of the record medium 102 is performed. Other operations are the same as those in the tenth embodiment.

The plane aligning operations will be described in detail below.

The plane aligning operation between the scan plane (X-Y plane) and the surface (X'-Y' plane) of the record medium 102 is performed.

The plurality of probe electrodes 101 are obliquely fixed to the probe electrode attachment 162, so that the Z direction position adjustment probe electrode (10, A) approaches the record medium 102 first. A voltage of 1 mV is applied to the Z direction position adjustment probe electrode (10, A) to displace its cantilever by 1 nm toward the record medium 102, and a bias voltage of 0.5 V is applied between the probe electrodes 101 and the record medium 102.

At an arbitrary point A on the record medium 102, the Z direction position adjustment probe electrode (10, A) and the record medium 102 are moved close to each other up to a tunnel region. The probe electrode 101 is moved to a point B on one corner of a recording region S while controlling the vertical distance of the probe electrode 101. The probe electrode 101 is moved along the outer periphery of the recording region S from the point B to points C, D, and E in turn while maintaining the constant tunnel region. A mechanism for detecting and correcting the slope between the scan plane and the record medium 102 is the same as that in the tenth embodiment.

Next, the plane aligning operation between the plurality of probe electrodes 101 and the record medium 102 is performed.

A voltage of 1 mV is also applied to the Z direction position adjustment probe electrodes (1, J) and (20, J) to displace their cantilevers by 1 nm toward the record medium, and a bias voltage of 0.5 V is applied between the probe electrodes 101 and the record medium 102.

The plane aligning method is the same as that in the tenth embodiment. With the above-mentioned operations, the plurality of probe electrode planes (X''-Y'' planes), the record medium surface (X'-Y' plane), and the scan plane (X-Y plane) can become parallel to each other.

In this state, a recording experiment was conducted by driving the X-Y directions fine movement mechanism, and applying a triangular wave of ±10 V between an arbitrary tunnel tip and the substrate electrode. In this case, the tip could be prevented from contacting the record medium, and information could be satisfactorily recorded/reproduced.

Twelfth Embodiment

Figure 24:
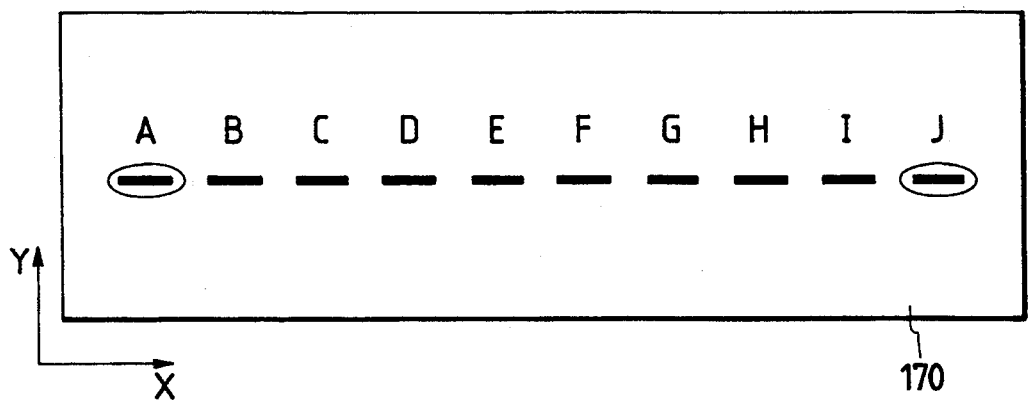
FIG. 24 is a top view of a plurality of probe electrodes used in a plane aligning method according to the twelfth embodiment of the present invention.

FIG. 24 is a top view of a substrate 170 for a plurality of probe electrodes 101 used in this embodiment. In FIG. 24, 10 probe electrodes are arranged in line in the X direction. The plurality of probe electrodes 101 are attached to the apparatus shown in FIG. 20. The structure of the apparatus is the same as those used in the tenth and eleventh embodiments. In this embodiment, however, the number of stacked piezoelectric elements for correcting the slope of the plurality of probe electrodes 101 is two. Column codes are printed on the upper side portion (FIG. 24) of the substrate 170. The two piezoelectric elements are arranged immediately above two Z direction position adjustment probe electrodes (A) and (J).

The apparatus used in this embodiment fixes the plurality of probe electrodes 101 in the X-Y directions, and finely moves the record medium 102 in the X-Y directions.

A plane aligning operation will be described in detail below.

First, the plane aligning operation between the plurality of probe electrodes 101 and the surface (X'-Y' plane) of the record medium 102 is performed.

The plurality of probe electrodes 101 are obliquely fixed to the probe electrode attachment 162, so that the Z direction position adjustment probe electrode (A) approaches the record medium 102 first. A voltage of 1 mV is applied to the Z direction position adjustment probe electrodes (A) and (j) to displace their cantilevers by 1 nm toward the record medium 102, and a bias voltage of 0.5 V is applied between the probe electrodes 101 and the record medium 102.

Figure 25A:
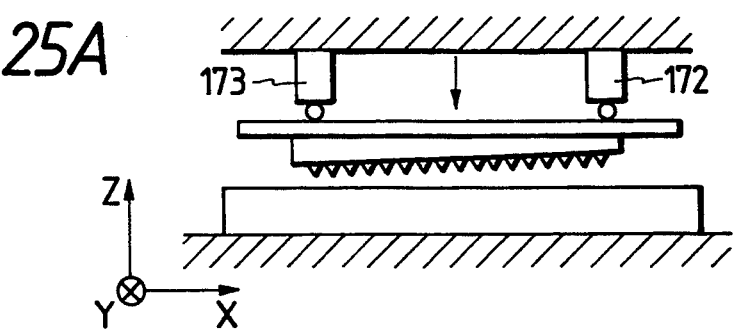
FIGS. 25A and 25B are sectional views for explaining the plane aligning method.

As shown in FIG. 25A, the Z direction position adjustment probe (A) is moved by the Z direction coarse movement mechanism to a position where it can detect a tunnel current of about $10^{-8}$ A.

Figure 25B:
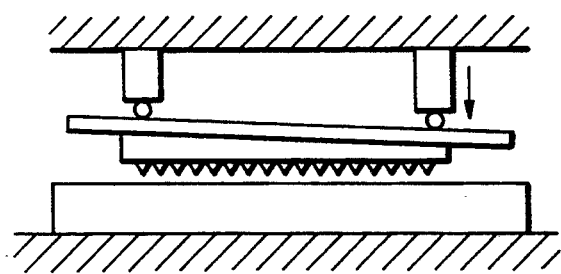

Then, as shown in FIG. 25B, a stacked piezoelectric element 172 is caused to expand so as to move the Z direction position adjustment probe electrode (J) until this electrode can detect a tunnel current equal to that detected by the Z direction position adjustment probe (A). When a voltage to be applied to the stacked piezoelectric element 172 is increased to 100 mV (about 10 nm in terms of displacement), the Z direction position adjustment probe electrode (J) can detect a tunnel current equal to that detected by the Z direction position adjustment probe electrode (A).

A voltage applied to the Z direction position adjustment probe (J) is set to be 0 V to restore the displacement of its cantilever.

Figure 14:
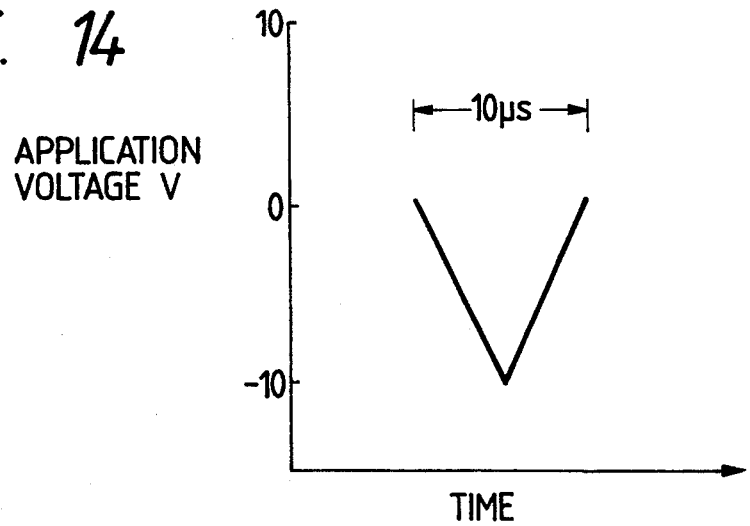
FIG. 14 is a graph showing a pulse voltage waveform to be applied to set a PI-LB film in an ON state.

The plane aligning operation between the surface (X'-Y' plane) of the record medium 102 and the scan plane (X-Y plane) is performed in the same manner as in the tenth embodiment (FIG. 14). The plane aligning method is the same as that in the tenth embodiment.

Upon completion of the plane aligning operations, a recording experiment was conducted by driving the X-Y directions fine movement mechanism, and applying a triangular wave of ±10 V between an arbitrary tunnel tip and the substrate electrode. In this case, the tip could be prevented from contacting the record medium, and information could be satisfactorily recorded/reproduced.

In the plane aligning operation between the surface of the record medium 102 and the scan plane, the Z direction position adjustment probe electrode (A) is used as a sensor. However, an arbitrary probe electrode may be used. For example, when the Z direction position adjustment probe electrode (J) was used as a sensor, the same result as described above could be obtained.

Figure 26:
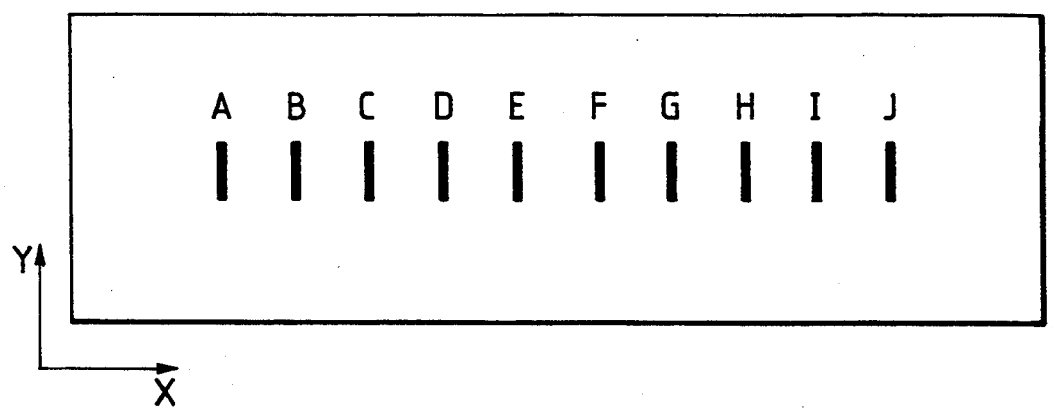
FIG. 26 is a top view of a plurality of probe electrodes used in a plane aligning method according to another embodiment of the present invention.
Figure 27:
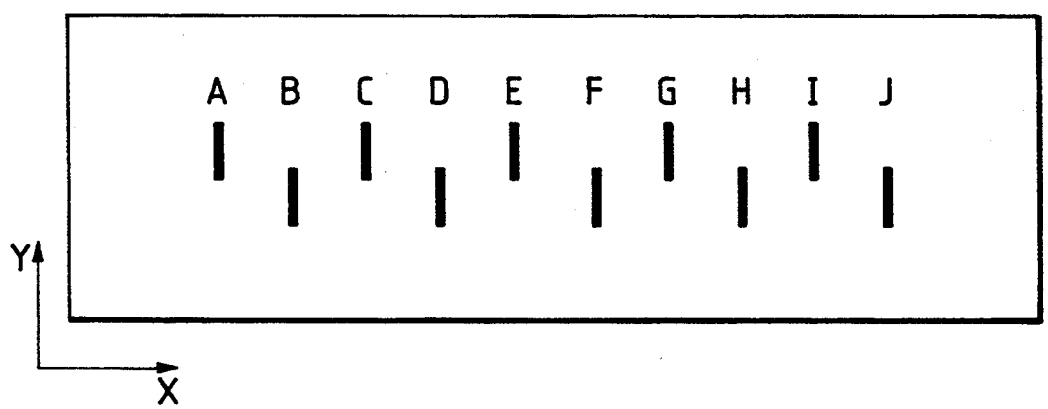
FIG. 27 is a top view of a plurality of probe electrodes used in a plane aligning method according to still another embodiment of the present invention.

On the substrate 170 for the plurality of probe electrodes shown in FIG. 24, the probe electrodes may be aligned, so that the longitudinal direction of the cantilever extends in the Y direction, as shown in FIG. 26, or only electrode tips may be aligned in line, as shown in FIG. 27.

As described above, according to the information processing apparatus and the information processing method of each of the above embodiments, the following effects can be expected.

(1) In an information processing apparatus and an information processing method, in which a scan type probe microscope technique is used, and a plurality of probes are arranged as an information processing head, information processing such as recording, reproduction, and erase operations with high positional precision can be performed, and reproducibility of information processing is high.

(2) Since information processing is performed after the planar direction of a record medium is set to be parallel to the scan direction of a probe, feedback control associated with position control of the probe in the Z axis direction (the normal direction to the surface of the record medium) can be simplified. In addition, since an arithmetic time required for the feedback control can be shortened, an information processing speed can be increased.

In the plane aligning method using the tilt mechanism of each of the above embodiments, since plane aligning operations of a plurality of probe electrodes and a record medium (X'-Y' plane) with respect to a scan plane (X-Y plane) are performed, the plurality of probe electrodes can be prevented from contacting the record medium. Therefore, write and read errors can be eliminated, and a high-speed scan operation can be realized.

What is claimed is:

1. A method of detecting a slope of a surface of an information record medium in an apparatus for detecting/writing information using a probe from/in the recording medium, said method comprising the steps of:
    scanning the surface of said information record medium in a two-dimensional direction using said probe;
    detecting information from the surface of said information record medium through said probe when the scanning step is executed;
    detecting a slope of the surface of said information record medium to a scan plane of said probe on the basis of the information detection result; and
    adjusting a relative slope between the surface of said information record medium and said scan plane of said probe on the basis of the detection result of said slope detecting step.

2. A method according to claim 1, wherein the scan step is executed by scanning an outer periphery of a region for detecting/writing information of the surface of said information record medium using said probe.

3. A method according to claim 1, wherein the information detection step is executed by detecting a current flowing between said probe and said information record medium.

4. A method according to claim 2, wherein the slope detection step is executed based on height data of a plurality of points on the surface of said information record medium obtained as a result of the information detection step.

5. A method according to claim 1, wherein said adjusting step includes a step of adjusting the slope of the surface of said information record medium on the basis of the detection result in said slope detecting step.

6. An apparatus for detecting/writing information using a probe from/in an information recording medium, comprising:
    information detecting/writing means for detecting/writing information from/in said information record medium through said probe;
    scan means for causing said probe to scan a surface of said information recording medium in a two-dimensional direction;

slope detecting means for detecting a slope of the surface of said information record medium to a scan plane of said probe on the basis of the information detection result of said information detecting/writing means; and adjusting means for adjusting a relative slope between the surface of said information record medium and said scan plane of said probe on the basis of the detection result of said slope detection means.

7. An apparatus according to claim 6, wherein said adjusting means adjusts the slope of the surface of said information record medium.

8. An apparatus according to claim 6, wherein said slope detection means detects the slope of the surface of said information record medium on the basis of the information detected by said information detection means when said scan means causes the probe to scan a periphery of a region for recording information on the surface of said information record medium.

9. An apparatus according to claim 6, wherein said information detection means detects a current flowing between said information record medium and said probe as the information.

10. An apparatus for detecting/writing information using a probe from/in an information record medium, comprising:

a voltage application circuit for applying a voltage for detecting/writing information to said information record medium through said probe;

a driving mechanism for causing said probe to scan a surface of said information record medium in a two-dimensional direction;

a control system for, when said driving mechanism performs a scan operation of the surface of said information record medium, detecting a current from the surface of said information record medium through said probe, and generating a control signal corresponding to the slope of the surface of said information record medium to a scan plane of said probe on the basis of the detection result; and a slope adjustment mechanism for adjusting the slope of the information record medium on the basis of the control signal.

11. A method of detecting a slope of a surface of an information record medium in an apparatus for detecting/writing information using a plurality of probes from/in said information record medium, comprising:

scanning the surface of said information record medium in a two-dimensional direction using said probes;

detecting information from the surface of said information record medium through said probes when the scanning step is executed;

detecting the slope of the surface of said information record medium to a scan plane of said information record medium or said probes on the basis of the information detection result; and adjusting a relative slope between the surface of said information record medium and the scan plane of said information record medium or the scan plane of said probes on the basis of the detection result in said slope detecting step.

12. A method according to claim 11, wherein the scanning step is executed by scanning an outer periphery of a region for detecting/writing information of the surface of said information record medium using said probe.

13. A method according to claim 11, wherein the information detection step is executed by detecting a current flowing between said probe and said information record medium.

14. A method according to claim 11, wherein the slope detection step is executed based on height data of a plurality of points on the surface of said information record medium obtained as a result of the information detection step.

15. A method according to claim 11, wherein the slope detection step is executed on the basis of a specific frequency signal of detection signals obtained as a result of the information detection step.

16. A method according to claim 11, further comprising, in the case a plurality of probes are used, adjusting said plurality of probes, respectively, in such a manner that a plane formed by ends of said plurality of probes become parallel with the surface of said information record medium.

17. An apparatus for detecting/writing information using a plurality of probes from/in an information record medium, comprising:

information detection/write means for detecting/writing information from/in said information record medium through said probes;

scan means for causing said probes to scan a surface of said information medium in a two-dimensional direction;

slope detection means for detecting a slope of the surface of said information record medium to a scan plane of said information record medium or said probes on the basis of the information detection result of said information detection/write means; and adjustment means for adjusting a relative slope between the surface of said information record medium and scan plane of said probes or the scan plane of said information record medium on the basis of the detection result of the slope detection means.

18. An apparatus according to claim 17, wherein said slope detection means detects the slope of the surface of said information record medium on the basis of the information detected by said information detection means when said scan means causes the probe to scan a periphery of a region for recording information on the surface of said information record medium.

19. An apparatus according to claim 17, wherein said information detection means generates a detection signal upon detection of the information, and said slope detection means detects the slope on the basis of a specific frequency component of the detection signal.

20. An apparatus according to claim 17, wherein said information detection means detects a current flowing between said information record medium and said probe as the information.

21. An apparatus according to claim 17, further comprising adjustment means, when a plurality of probes are used, for adjusting said plurality of probes, respectively, in such a manner that a plane formed by ends of said plurality of probes become parallel with the surface of said information record medium.

22. A method according to claim 11, wherein said adjusting step includes a step of adjusting the slope of the surface of said information record medium on the basis of the detection result in said slope detecting step.

23. An apparatus according to claim 17, wherein said adjusting means adjusts the slope of the surface of said information record medium.

* * * * *